United States Patent
Velayudhan

(10) Patent No.: US 10,069,743 B2
(45) Date of Patent: *Sep. 4, 2018

(54) ENHANCING CAPACITY OF A DIRECT COMMUNICATION LINK

(71) Applicant: ViaSat, Inc., Carlsbad, CA (US)

(72) Inventor: Nirmalkumar Velayudhan, San Marcos, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,426

(22) Filed: Jul. 24, 2017

(65) Prior Publication Data
US 2017/0331751 A1 Nov. 16, 2017

Related U.S. Application Data

(62) Division of application No. 14/946,207, filed on Nov. 19, 2015, now Pat. No. 9,755,979.

(51) Int. Cl.
*H04L 12/825* (2013.01)
*H04L 12/803* (2013.01)
*H04L 12/707* (2013.01)

(52) U.S. Cl.
CPC ............. *H04L 47/25* (2013.01); *H04L 45/22* (2013.01); *H04L 47/125* (2013.01)

(58) Field of Classification Search
CPC ....... H04L 47/25; H04L 45/22; H04L 47/125; G06F 11/1092
See application file for complete search history.

(56) References Cited

U.S. PATENT DOCUMENTS

| | | |
|---|---|---|
| 6,223,252 B1 | 4/2001 | Bandera et al. |
| 8,824,261 B1 | 9/2014 | Miller et al. |
| 8,832,234 B1 | 9/2014 | Brooker et al. |
| 8,949,533 B2 | 2/2015 | Puthalath et al. |
| 9,276,900 B1 | 3/2016 | Daud et al. |
| 9,317,381 B2 | 4/2016 | Suzuki et al. |
| 9,529,772 B1 | 12/2016 | Shankaran |
| 2004/0255206 A1 | 12/2004 | Sato et al. |
| 2008/0189578 A1 | 8/2008 | Raghuraman et al. |
| 2009/0125671 A1 | 5/2009 | Flynn et al. |

(Continued)

*Primary Examiner* — Khaled Kassim
*Assistant Examiner* — Syed S Ali
(74) *Attorney, Agent, or Firm* — Holland & Hart LLP

(57) ABSTRACT

Capacity enhancement of a direct communication link using a variable redundancy delivery network. An estimated information rate between a source node and a terminal node may be partitioned into a first information rate provided via the direct communication link and a second information rate to be provided via the variable redundancy delivery network. One or more parameters of the variable redundancy delivery network may be calculated to provide the second information rate based on a non-uniform probability density of messages requested by the terminal node. Capacity and reliability of storage media devices in the variable redundancy delivery network may be traded off to provide the second information rate. The variable redundancy delivery network may implement various coding schemes and per-message coding rates that may be determined based on the non-uniform probability distribution of the source message library.

21 Claims, 13 Drawing Sheets

(56) References Cited

U.S. PATENT DOCUMENTS

| | | |
|---|---|---|
| 2011/0072206 A1 | 3/2011 | Ross et al. |
| 2012/0254342 A1 | 10/2012 | Evans |
| 2013/0145209 A1 | 6/2013 | Saito |
| 2014/0095457 A1 | 4/2014 | Quan |
| 2015/0172169 A1* | 6/2015 | DeCusatis ............... H04L 45/14 718/1 |
| 2015/0172183 A1* | 6/2015 | DeCusatis ........... H04L 12/4633 370/392 |
| 2016/0094356 A1 | 3/2016 | Xiang |
| 2016/0249405 A1* | 8/2016 | Koc ..................... H04L 5/0032 |
| 2016/0301610 A1* | 10/2016 | Amit ................... H04L 67/1097 |
| 2016/0308774 A1* | 10/2016 | Astigarraga ............ H04L 47/25 |
| 2016/0373337 A1* | 12/2016 | DeCusatis ............... H04L 45/14 |
| 2017/0034064 A1* | 2/2017 | Everhart ................. H04L 47/25 |
| 2017/0109247 A1 | 4/2017 | Nakajima |
| 2017/0215303 A1* | 7/2017 | Mick .................. H05K 7/20836 |
| 2017/0304725 A1* | 10/2017 | Perlman ................ A63F 13/12 |
| 2017/0366622 A9* | 12/2017 | St. Laurent ............. H04L 67/16 |
| 2018/0013588 A1* | 1/2018 | Du ......................... H04L 45/66 |
| 2018/0014041 A1* | 1/2018 | Chen .................. H04N 21/2347 |
| 2018/0041485 A1* | 2/2018 | O'Hare ................. H04L 63/065 |

* cited by examiner

ENHANCING CAPACITY OF A DIRECT COMMUNICATION LINK

CROSS REFERENCES

This application is a divisional of U.S. Non-Provisional patent application Ser. No. 14/946,207, filed Nov. 19, 2015, and entitled, "Enhancing Capacity of a Direct Communication Link," the contents of which are incorporated by reference for all purposes.

BACKGROUND

Field of the Disclosure

The present disclosure relates to broadband communications in general, and in particular, to enhancing capacity of a direct communication link in broadband communications networks.

Relevant Background

As the use of communications and networking continues to grow around the world, users are demanding a high-quality broadband experience even in remote areas or mobile environments. The ability to provide a high-quality broadband experience in these environments presents many challenges.

SUMMARY

Methods, systems, and devices are described for capacity enhancement of a direct communication link using a variable redundancy delivery network. An estimated information rate between a source node and a terminal node may be partitioned into a first information rate provided via the direct communication link and a second information rate to be provided via the variable redundancy delivery network. One or more parameters of the variable redundancy delivery network may be selected to provide the second information rate based on a non-uniform probability density of messages requested by the terminal node.

The variable redundancy delivery network may include multiple intermediate storage nodes in a non-redundant disk array configuration. For example, each intermediate storage node may be a logical storage unit including a storage media device. Capacity and reliability of the storage media devices may be traded off to provide the second information rate. For example, the storage media devices may be a relatively low reliability storage device (e.g., rotating disk storage media) having a relatively higher storage capacity. Additionally or alternatively, some intermediate storage nodes may include solid state storage media, which typically has higher reliability but lower storage capacity per device.

The variable redundancy delivery network may implement various coding schemes and per-message coding rates that may be determined based on a non-uniform probability distribution of messages requested by multiple users at the terminal node. In some embodiments, the storage policy may be an optimal policy or a heuristically determined policy.

Described aspects include a method for capacity enhancement of a communications system including a terminal node coupled to a source node via a direct communications link and via a variable redundancy delivery network comprising one or more intermediate storage nodes. The method may include determining an estimated information rate from the source node to the terminal node, partitioning the estimated information rate into a first information rate for the direct communications link and a second information rate for the variable redundancy delivery network, wherein the first information rate is based on channel capacity of the direct communications link, and selecting one or more parameters of the variable redundancy delivery network to provide the second information rate based at least in part on a non-uniform probability density of the messages, wherein the one or more parameters includes at least one of a reliability characteristic of the one or more intermediate storage nodes, a storage size of the one or more intermediate storage nodes, a number of the one or more intermediate storage nodes, or a storage policy for storage of messages distributed to the terminal node in the one or more intermediate storage nodes, and wherein the storage policy comprises variable redundancy for the storage of the messages according to a redundancy coding scheme.

Other described aspects include a method for capacity enhancement of a communications system is described, the method comprising repeatedly delivering a plurality of messages of a finite message library to a terminal node from a source node, the terminal node coupled to the source node via a direct communications link and a variable redundancy delivery network comprising one or more intermediate storage nodes, storing a given message of the plurality of messages in a first location in the one or more intermediate storage nodes when the given message has been delivered to the terminal node a first threshold number of times, storing the given message in a second location in the one or more intermediate storage nodes when the given message has been delivered to the terminal node a second threshold number of times, determining that the given message is to be delivered to the terminal node, in response to the determination, delivering the given message stored in the one or more intermediate storage nodes to the terminal node.

Yet other described aspects include a communication system comprising a terminal node, a source node, a direct communications link to deliver messages to the terminal node via the source node, and a variable redundancy delivery network to deliver the messages to the terminal node, the variable redundancy delivery network comprising one or more intermediate storage nodes redundantly storing the messages with variable redundancy in multiple locations based on a non-uniform probability density of the messages.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
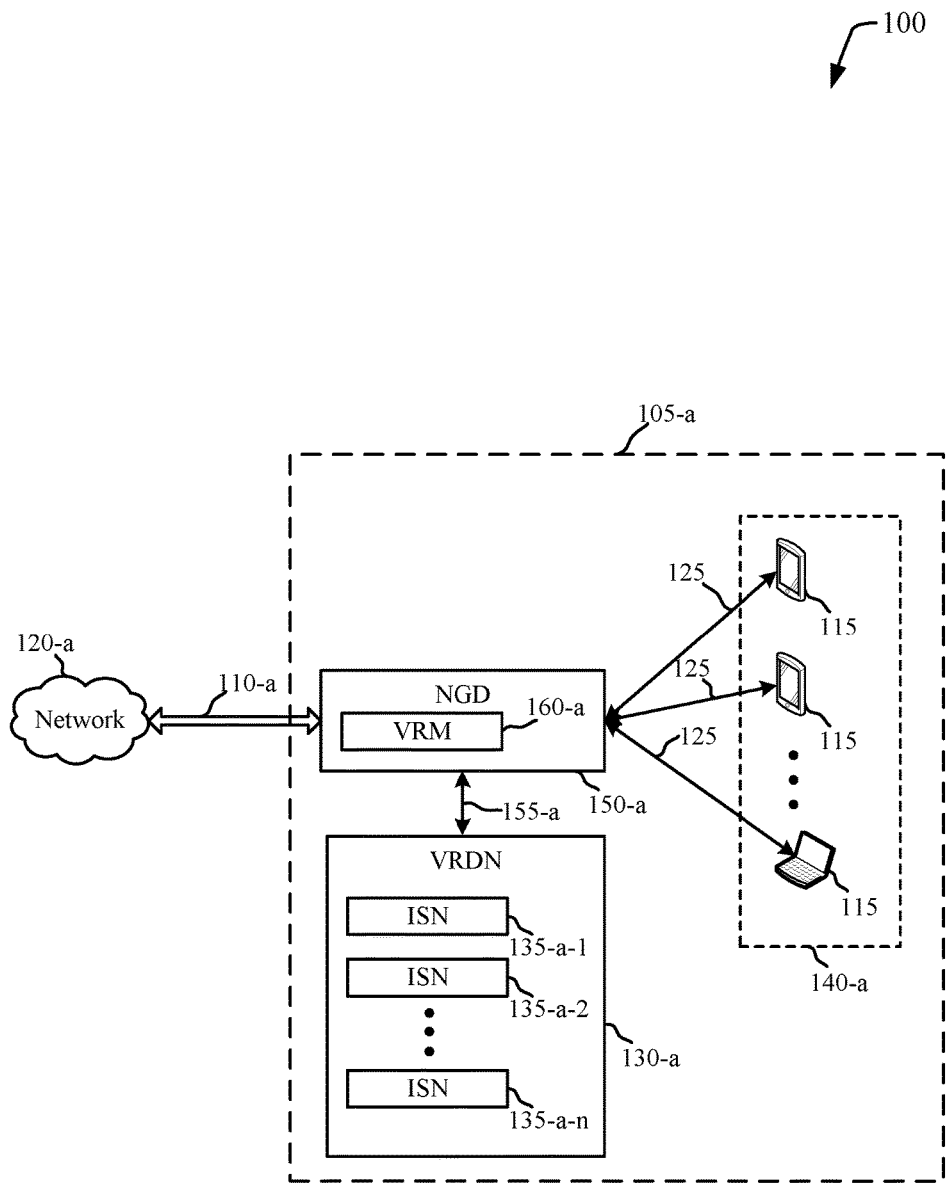
FIG. 1 shows an example communications environment for capacity enhancement of a direct communication link in accordance with various aspects of the disclosure.

The described feature generally relate to capacity enhancement of a direct communication link serving multiple users using a variable redundancy delivery network. In some examples, an estimated information rate for serving the multiple users may be partitioned into a first information rate provided via the direct communication link and a second information rate to be provided via the variable redundancy delivery network. The variable redundancy delivery network may implement a storage policy that may include various redundancy coding schemes and a variable message redundancy policy that may be determined based on a non-uniform probability distribution of messages requested by the multiple users. In some embodiments, the variable message redundancy policy may be an optimal policy or a heuristically determined policy. One or more parameters of the variable redundancy delivery network may be selected to provide the second information rate based on the non-uniform probability density of messages requested by the users.

The variable redundancy delivery network may include multiple intermediate storage nodes in a non-redundant disk array configuration. For example, each intermediate storage node may be a logical storage unit and may be or include a storage media device (e.g., storage drive, etc.). Capacity and reliability of the storage media devices may be traded off to provide the second information rate. For example, the storage media devices may be a relatively low reliability storage device (e.g., rotating disk storage media) having a relatively higher storage capacity. Additionally or alternatively, some or all intermediate storage nodes may include solid state storage media, which typically has higher reliability but lower storage capacity per device. The variable redundancy delivery network may dynamically optimize the storage policy based on changes in the distribution of requested messages or changes in total storage or number of nodes (e.g., due to node failure, etc.) to optimize the second information rate.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

The rise in consumption of network multimedia content such as systems providing audio and video on demand (AVOD) and use of audio and video sharing services (e.g., YouTube, Vine, etc.) has dramatically increased consumer bandwidth usage. In addition, users increasingly expect a high-quality broadband experience while travelling. For example, there is a growing demand for network access service during air travel, and the desire to be able to access network multimedia content on airplanes and in other mobile environments has created challenges in providing sufficient bandwidth for users over bandwidth-limited wireless networks.

In various mobile environments, multiple users may be provided network access service via a shared communication link. For example, users may connect their communication devices to a wireless local area network (WLAN), which routes data communications to other networks (e.g., the Internet) via the shared communication link. The shared communication link may be a wireless link (e.g., cellular link, satellite communications link, etc.), and may have limited communication bandwidth. For example, while the resources (e.g., frequency, time, etc.) of a wireless network may be flexibly applied for multiple users, the overall capacity of the network may be limited, and congestion can occur when users request more resources at a particular time than the network can support. Increasing bandwidth for wireless communications systems is expensive and sometimes additional usable spectrum is unavailable. Therefore, providing a high-quality network access experience at a reasonable cost in mobile environments presents many challenges.

FIG. 1 shows an example communications environment 100 for capacity enhancement of a direct communication link in accordance with various aspects of the disclosure. The communications environment 100 includes a direct communication link 110-$a$ used for providing network access service for multiple communication devices 115 (represented as a terminal node 140-$a$) of a mobile environment 105-$a$ via a network gateway device 150-$a$. The communication devices 115 may be mobile devices (e.g., smartphones, laptops, tablets, netbooks, and the like) and may communicate with the network gateway device 150-a via communication links 125. Communication links 125 may be, for example, part of a local network such as a WLAN. The communication devices 115 may be user devices located in mobile environment 105-a, which also includes the network gateway device 150-a.

The direct communication link 110-a may be a wireless communication link between the network gateway device 150-a located on the mobile environment 105-a and one or more networks 120-a, which may include any suitable public or private networks and may be connected to other communications networks such as the Internet, telephony networks (e.g., Public Switched Telephone Network (PSTN), etc.), and the like. The information rate for servicing the communication devices 115 may depend on the number of communication devices 115 in the mobile environment 105-a and types of traffic requested by the users, and may vary over time. For example, the network traffic (also referred to herein as "messages") requested by the communication devices 115 may include a mix of web traffic, streaming traffic, and other types of traffic. The types of network traffic that generally consume the most communication resources are file sharing and video communications (e.g., video conferencing, video streaming, etc.) with some estimates indicating that as much as 50% of all Internet traffic is video streaming traffic.

Figure 2:
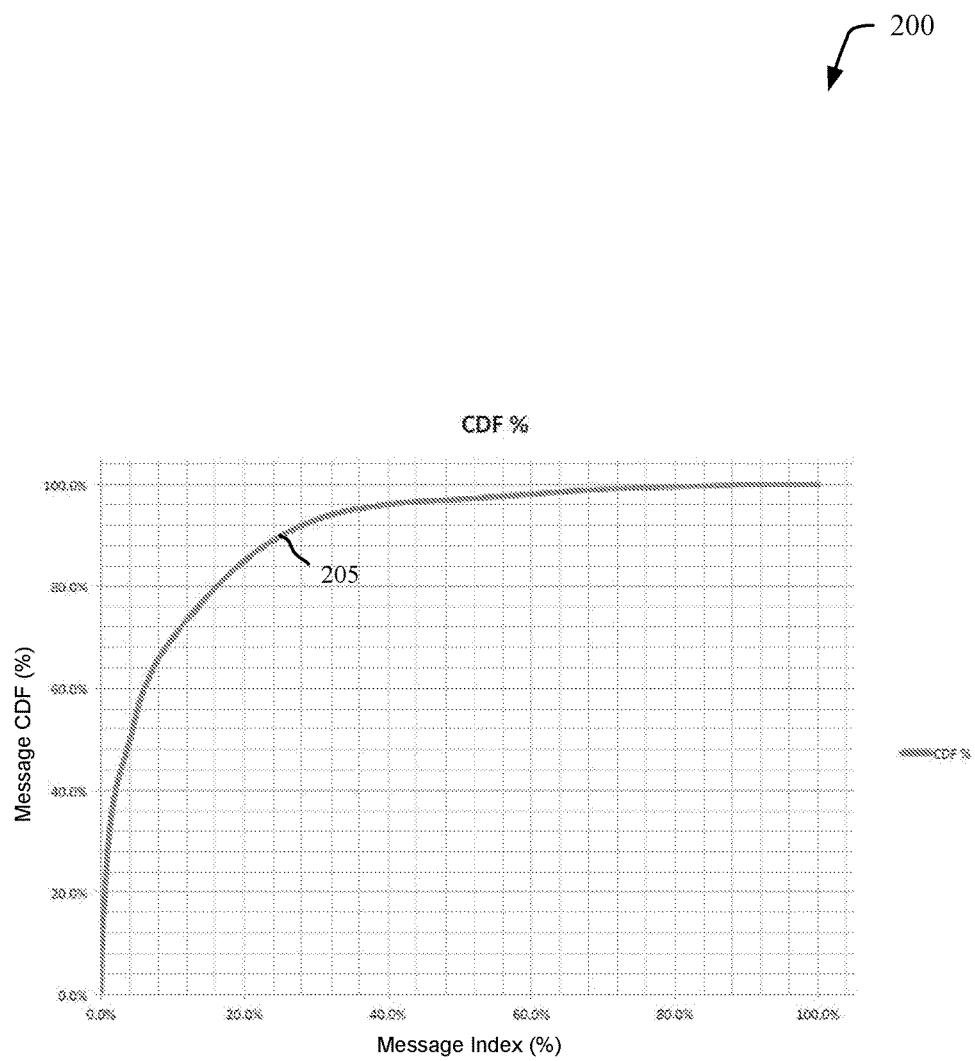
FIG. 2 shows one example of a cumulative distribution function of an example message library, in accordance with various aspects of the disclosure.

The probability distribution of requested content tends to be non-uniform. For example, the same streaming traffic may be requested by multiple users at different points in time, or may be shared across multiple users if they request broadcast or multicast streaming traffic. FIG. 2 shows a plot 200 of a cumulative distribution function (CDF) 205 for an example message library, in accordance with various aspects of the disclosure. A message in the message library may be some or all of a piece of content. For example, a message may be some or all of an audio-video item (e.g., a movie, television show, etc.), an audio-only item (e.g., a song, etc.), or any other type of network traffic data that can be stored locally to a mobile environment (e.g., mobile environment 105-a of FIG. 1, etc.) and subsequently provided to a terminal node (e.g., one or more communication devices 115 of FIG. 1, etc.) in response to additional requests for the message. CDF 205 may illustrate, for example, the cumulative message requests as a function of a message index shown as a percentage of unique messages. CDF 205 is approximately log-linear, with 20% of the unique messages accounting for approximately 85% of the message requests. Similarly, content such as "viral" videos may be repeatedly requested by many different users within a span of days or even hours.

Returning to FIG. 1, the capacity of direct communication link 110-a may be flexible to meet the information rate demands of the communication devices 115 represented by terminal node 140-a. However, the information rate provided by direct communication link 110-a may have limits given by system bandwidth, hardware limitations (e.g., power constraints), or overall system capacity. For example, communications environment 100 may be part of a communications system, which may have a limited overall information rate capacity. In addition, the incremental cost for the information rate provided over direct communication link 110-a may be relatively high. While it may be possible to restrict some types of traffic (e.g., high definition video, etc.), this may degrade the network access experience for various users. These and other issues of providing network access service in mobile environments typically result in high cost of service, a reduced quality user experience, or both.

One way to increase the effective information rate of direct communication link 110-a is to store some content locally to the mobile environment 105-a. For example, when a communication device 115 makes requests for a set of messages from network 120-a via the direct communication link 110-a, the messages can also be stored in a storage system connected to network gateway device 150-a. If the same set of messages are then later requested by other communication devices 115, the stored messages can be provided from the local storage instead of being re-sent over the direct communication link 110-a. The amount of effective information rate enhancement provided by locally stored content depends on the amount of storage, the reliability of the storage system, and the probability distribution of requested messages. To provide a significant effective increase in information rate (e.g., 10% or higher) provided to the communication devices 115, the local storage capacity required may be large. For example, to cover a substantial percentage of streaming traffic (e.g., 10-50%), storage capacities in the 10-200 Terabyte (TB) range may be necessary.

Different types of storage media may have different trade-offs between storage capacity and reliability. For example, a rotating disk storage device (commonly known as a hard disk drive (HDD)) uses a rotating magnetic media platter with a read and write head that operates over the magnetic surface to detect and modify magnetization of the magnetic medium on the platter. Rotating disk storage devices have relatively high storage capacity while providing data access in any desired order (e.g., random access). A solid state drive (SSD) is a data storage device that uses electronic non-volatile storage media (e.g., NAND flash memory, magnetoresistive random-access memory (MRAM), etc.) to persistently store data (maintain data when powered off). Hybrid drives are devices that include both SSD and HDD technology.

In some cases, the mobile environment 105-a may be subject to substantial shock and vibration, as well as other extreme environmental conditions. For example, the mobile environment 105-a may be an aircraft, which may suffer from vibration due to engines and hydraulic systems, and may encounter turbulence that results in significant gravitational forces (g-forces) seen by components on the aircraft. Other mobile environments such as ships and trains may also see significant shock or vibration occur intermittently. Compared with HDDs, SSDs are typically more resistant to physical shock, run silently, have lower access time, and less latency. Because HDDs have read/write heads that float above spinning platters, HDDs may be susceptible to shock and vibration, as well as other mechanical failure mechanisms. In contrast, mechanical failure rates for SSDs are generally low because SSDs have no moving parts. However, SSDs may have a limited number of write cycles (or erase cycles), which may affect life-time of the drive in certain applications.

Higher cost is a substantial drawback to the use of SSDs for larger capacity storage applications. For example, consumer-grade SSDs may be approximately 10 times more expensive per unit of storage than consumer-grade HDDs. Although prices for SSDs are declining, the consumer price for SSDs may currently be in the range of $500-$1500 per TB of storage (depending on drive storage size) compared to approximately $40-80 per TB for HDDs. Additionally, the available storage capacity in a single HDD device is generally larger than that available for a single SSD device. For example, the largest available 3.5" consumer HDDs may be in the 8-12 TB range, while the largest available SSDs, although a smaller form factor, may be in the 1-2 TB range. Thus, many more SSD devices may be necessary to provide a given total storage size.

To create a storage system using multiple drive devices, data virtualization techniques such as redundant array of independent disks (RAID) may be used to combine multiple drive devices into a single logical unit that stores data using redundancy techniques. A commonly used RAID technique is data mirroring where a set of data is written to two or more drive devices, and the data is available as long as at least one drive device where the data is stored is functional. Another RAID technique for use with more than two drive devices is striping with distributed parity information. Striping with distributed parity information may provide higher effective storage capacity for a given total storage size but is only tolerant of failure of a single drive device. Fault tolerance may be increased by increasing the parity information (e.g., double parity information for fault tolerance of up to two failed drives, etc.), at the expense of effective capacity.

In embodiments, the communications environment 100 is configured to increase the effective capacity between the network 120 and the communication devices 115 by using a variable redundancy delivery network (VRDN) 130-a to store messages for subsequent delivery to communication devices 115. The VRDN 130-a includes intermediate storage nodes (ISNs) 135-a (e.g., ISNs 135-a-1, 135-a-2, . . . , 135-a-n), which may each include a storage device (e.g., HDD, SSD, Hybrid drive, etc.). In some examples, a system may include different types of ISNs 135-a (e.g., HDD, SSD, hybrid drives, etc.).

The VRDN 130-a may provide control of message flow for messages requested by the terminal node 140-a (e.g., communication devices 115, etc.) via the network gateway device 150-a. The VRDN 130-a may include variable redundancy manager (VRM) 160-a, which may manage redundancy of messages on VRDN 130-a based on a storage policy. The storage policy may be based on a non-uniform distribution of message requests (e.g., frequency of request of the messages). In some examples, VRDN 130-a is connected with the network gateway device 150-a via a local network 155-a (e.g., local area network (LAN), storage area network (SAN), etc.). Each ISN 135-a may present itself on local network 155-a as a separate logical storage unit (e.g., without internal redundancy). In other examples, VRM 160-a may be part of VRDN 130-a and may communicate with network gateway device 150-a via a connection 155-a (e.g., LAN, SAN, etc.).

Figure 3:
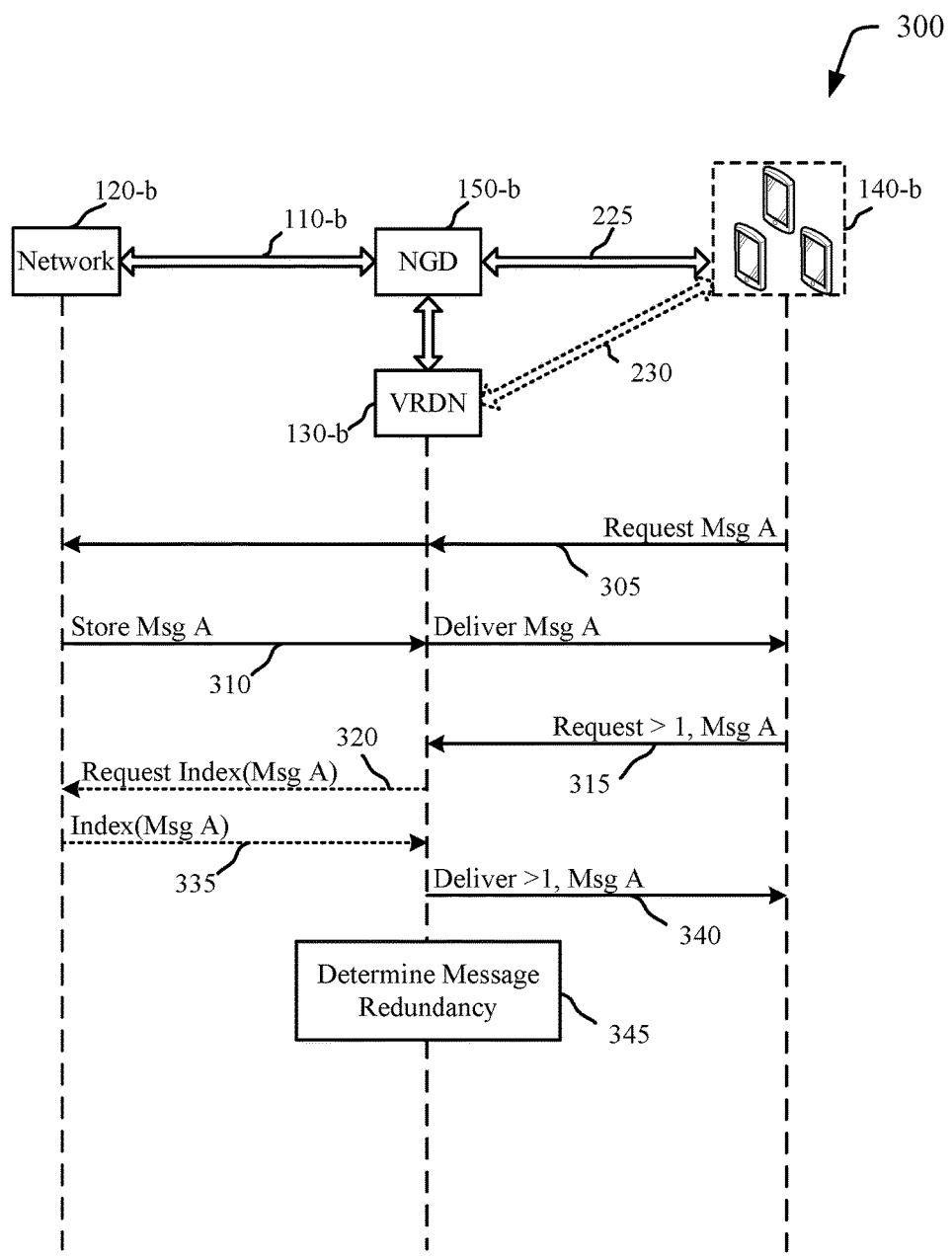
FIG. 3 shows a flow diagram of an example message flow for capacity enhancement of network access service in accordance with various aspects of the disclosure.

FIG. 3 shows a flow diagram 300 of an example message flow for capacity enhancement of network access service in accordance with various aspects of the disclosure. Flow diagram 300 illustrates message flow between a network 120-b, network gateway device 150-b, VRDN 130-b, and a terminal node 140-b, which may be, for example, the network 120-a, network gateway device 150-a, VRDN 130-a, and terminal node 140-a of FIG. 1. The terminal node 140-b may be provided network access service to network 120-b via network gateway device 150-b, which may have a direct communication link 110-b to network 120-b. Network gateway device 150-b may be connected to VRDN 130-b. Terminal node 140-b (e.g., user devices 115 of FIG. 1) may be connected to network gateway device 150-b via links 225 (e.g., LAN, WLAN, etc.). Optionally, one or more devices of terminal node 140-b may be connected directly to VRDN 130-b via links 230 (e.g., where VRDN is a node of a local network coupled with network gateway device 150-b and the devices of terminal node 140-b). Flow diagram 200 may illustrate, for example, message flow in the communications environment 100 of FIG. 1.

VRDN 130-b may be understood as providing an indirect communication link that increases the apparent capacity of direct communication link 110-b. Thus, terminal node 140-b may receive messages from network 120-b via the direct communications link 110-b, or via an indirect communication link from VRDN 130-b providing stored messages that may have previously been received via direct communication link 110-b. If the physical link capacity of links 225 and/or 230 are large with respect to the physical capacity of direct communication link 110-b, the effective data rate of the indirect communication link provided by VRDN 130-b may be dependent on the probability that VRDN 130-b has a given message requested by terminal node 140-b.

In flow diagram 300, a request 305 for message A may be sent by terminal node 140-b. Message A may be, for example, a file or object that is part of a video stream (e.g., HTTP live streaming (HLS) file, etc.) requested from a content server of network 120-b by a communication device 115 in the communications environment 100 of FIG. 1. The request 305 may be the first request for message A from a communication device 115. Thus, message A may not be stored in VRDN 130-b and network gateway device 150-b may send the request 305 to network 120-b.

The network 120-b may respond 310 with message A, which may be delivered to the terminal node 140-b. The message A may also be stored in VRDN 130-b. In some cases, whether message A is stored in VRDN 130-b may depend on the type of the message (e.g., determining that message A is a type of message for which a local copy can be delivered in response to a subsequent request, etc.).

One or more subsequent requests 315 for message A may be sent by the terminal node 140-b (e.g., by other communication devices 115 in the communications environment 100 of FIG. 1, etc.). Because message A is stored in VRDN 130-b, the content of message A may be delivered 340 to the terminal node 140-b without sending the message itself over the direct communications link 110-b. In some cases, network gateway device 150-b may request 320 an index to message A and network 120-b may send index 335 in response to the request 320, which may correspond to a location of message A in VRDN 130-b. Alternatively, NGD 150-b may intercept one or more of the requests 315 and VRDN 130-b may deliver 340 message A to terminal node 140-b in response to the requests without receiving index 335 for each request of message A.

VRDN 130-b may determine message redundancy at block 345 for message A based on the requests 315. In embodiments, the VRDN 130-b may include multiple (e.g., N) ISNs 135-a and storage of message A in one or more of the ISNs 135-a may be according to a storage policy that may be determined based on a statistical distribution of messages. For example, a probability density function (PDF) represented by $\rho(x)$ may be understood as the probability that a given message will be requested according to message index x, if requested messages are ordered according to frequency of request, generally decreases with increasing x. The CDF that corresponds to $\rho(x)$ may be given by $F(x)$.

The storage policy may include a redundancy coding scheme (e.g., message replication, parity codes, Reed-Solomon codes, etc.) and a message redundancy policy u that represents the redundancy as a function of message index x. A mapping function $g(u)$ may describe the total storage needed for a given redundancy level for a given redundancy coding scheme. For repetition coding (e.g., replication of a message across ISNs), the message redundancy policy u may be understood as the number of times the message is stored and the mapping function g(u) may be unity. Determining message redundancy at block 345 may include determining a redundancy for message A based on the storage policy.

Returning to FIG. 1, it may be desired to provide a given information rate $R_0$ to the terminal node 140-a for a communication service. For a multi-user environment such as a communication service for passengers on a commercial aircraft, $R_0$ may be estimated as:

$$R_0 = N_P \cdot TR \cdot R_U \qquad (1)$$

where:
  $N_P$ is the number of passengers;
  TR is the take rate of the communication service; and
  $R_U$ is the estimated information rate per user.

The estimated information rate $R_0$ may be divided into $R_1$, an information rate of the direct communication link 110-a, and $R_2$, an information rate from the VRDN 130-a, such that:

$$R_0 = R_1 + R_2 \qquad (2)$$

Or:

$$R_2 = R_0 - R_1 \qquad (3)$$

The message availability from the VRDN depends on the percentage of unique messages stored in the VRDN, the message PDF $\rho(x)$, and how those messages are stored. In some aspects, the information rate from the VRDN $R_2$ may be understood as a function of the minimum message availability from the VRDN $P_I^{min}$ to provide a given information rate $R_0$, such that:

$$P_I^{min} = \frac{R_2}{R_0} \qquad (4)$$

The probability of message availability from the VRDN 130-a $P_I$ is dependent on the message PDF $\rho(x)$ and message redundancy policy u, and can be given by:

$$P_I(u) = \int_0^\infty \rho(x)\phi_u(x)dx \qquad (5)$$

where:
  $\phi_u(x)$ is the message delivery reliability (i.e., probability that message x can be delivered from a given storage system having a given message redundancy policy u).

The message delivery reliability $\phi_u(x)$ for a given message x is dependent on whether the message has been stored, how the message is stored, and a message retrieval reliability $M_{rr}$. Whether the message has been stored and how the message is stored depend on the physical parameters of the storage system (e.g., total storage size, number of nodes) and the storage policy.

Message retrieval reliability $M_{rr}$ is defined as the probability over a given time period (e.g., a year) that a given message stored in a given individual storage node can be accessed (successfully read out). The message retrieval reliability depends on the drive failure rate over the given time period of the given individual storage node, and further depends on the probability of an unrecoverable read error (URE) over the given time period of the given message stored in the given individual storage node. Generally, the drive failure rate and the probability of URE are independent, although this may not be true in all cases.

The drive failure rate is the rate at which the given individual storage node malfunctions and thus none of the stored messages can be accessed. The drive failure rate is dependent on drive characteristics (e.g., SSD, HDD, etc.) and possibly the operational environment. A URE is the loss of any stored message due to uncorrectable bit error(s) and/or temporary inaccessibility of data. For example, an intermediate storage node may enter a protected mode if adverse environmental conditions are detected and the messages stored on the node may be temporarily unavailable. A URE depends on drive characteristics and the error correction coding (if any) that is used for storing messages in the given individual storage node.

If the total storage size of the VRDN is L, the following constraint holds:

$$L = \int_0^X g(u(x))dx \qquad (6)$$

where:
  u(x) is the message redundancy policy for a given storage policy;
  g(n) is a function of the redundancy coding scheme used for the given storage policy and accounts for possible redundancy coding schemes that are not direct replication; and
  X is the index of the lowest frequency message stored (i.e., all messages in the range [0;X] are stored at least once with the messages sorted by decreasing frequency).

The storage policy may be selected using a variety of techniques. For example, the redundancy coding scheme used for the storage policy may be selected based on system attributes (e.g., processing capabilities, expected URE types, etc.). The message redundancy policy u may be a fixed message redundancy policy. For example, the message redundancy policy u may be predetermined according to an estimated message PDF $\rho(x)$, and may be independent of the parameters of the VRDN. Alternatively, the message redundancy policy u may be determined based on various system parameters for the VRDN (e.g., total storage size, number of nodes, message retrieval reliability, etc.).

In some examples, message redundancy policy u is determined using optimization techniques. For example, expressions 5 and 6 can be seen as an optimal control problem satisfying the conditions for maximizing an objective function using Pontryagin's Maximum Principle with free terminal condition (e.g., X is not explicitly fixed). The optimization problem may be understood as finding a message redundancy policy u* that maximizes $P_I$, given $\phi_u(x)$, $\rho(x)$, L, and g(n). Or, restated:

$$u^* = \max_u \left[ \int_0^X \rho(x)\phi_u(x)dx \right] \qquad (7)$$

$$\text{s.t. } L = \int_0^X g(u(x))dx \qquad (8)$$

Expressions 7 and 8 may be solved to find the optimal message redundancy policy u* using known techniques (e.g., Ross-Fahroo pseudo-spectral methods, shooting methods, etc.).

For designing a VRDN 130 to provide a desired information rate $R_2$ given a known or estimated CDF F(x) and overall information rate $R_0$, one or more parameters of the VRDN 130 (e.g., number of storage nodes N, types of storage nodes, total storage L, storage policy, etc.) may be selected and the probability of message availability from the VRDN $P_I$ determined. For the given system parameters, it may be determined if the probability of message availability from the VRDN $P_I$ provides the desired information rate $R_2$ for the system. The system parameters of the VRDN 130 may then be iteratively adapted until the desired information rate $R_2$ can be achieved. The iteration may be performed over the system design variables (e.g., storage policy, number of storage nodes N, type of storage node, total storage L, etc.) to achieve the desired information rate $R_2$ or to satisfy other constraints (e.g., size, weight, cost, etc.). In some examples, the storage policy may be adapted for various iteration steps. For example, the message redundancy policy u(x) may be optimized at each of a number of iteration steps (e.g., for given types of ISNs, number of storage nodes N, and total storage L, etc.).

Figure 4:
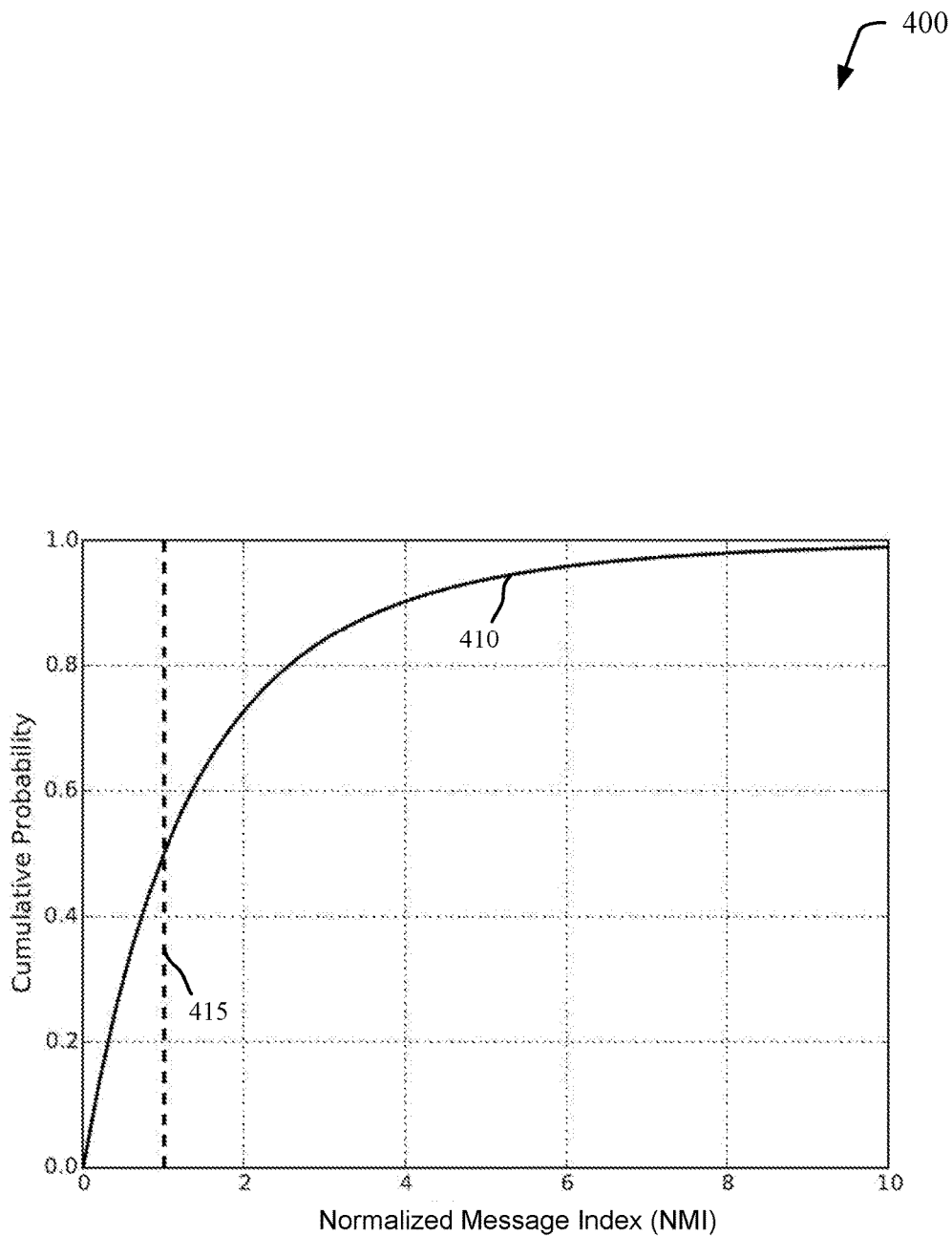
FIG. 4 shows a plot of a normalized cumulative distribution function in accordance with various aspects of the present disclosure.

FIG. 4 shows a plot 400 of a normalized cumulative distribution function in accordance with various aspects of the present disclosure. In the example normalized message CDF 410 of FIG. 4, the message distribution is represented using a heavy-tailed Pareto distribution parameterized by values β, ϵ. For example, the message distribution may be given by:

$$F(x) = \int_0^x \rho(s)ds = 1 - \left(\frac{\epsilon}{1+\epsilon}\right)^\beta \quad (9)$$

We assume that messages are ordered in decreasing (probabilistic) frequency, so expression 9 couples the quantity of unique messages (i.e., x) with the proportion of total requested messages that are within the quantity x. Without loss of generality, we may normalize the message CDF F(x) such that F(1)=½. In addition, the size of the messages may be normalized to a selected message unit size (e.g., larger messages may be represented by multiple normalized messages, etc.). Thus, FIG. 4 illustrates the message CDF F(x) shown as a function of the normalized message index (NMI) x. This yields the constraint:

$$\epsilon = \frac{(1/2)^{1/\beta}}{1 - 1/2^{1/B}} \quad (10)$$

Under this scaling, messages in the range [0; 1] would account for half of the total messages expected over a given time period, as shown by line 415. In some aspects, a heavy-tailed distribution has properties that reflect realistic scenarios. In particular, for heavy tailed distributions it is infeasible to store nearly all messages due to the wide variety of messages that are possible. Thus, there are diminishing returns for larger storage capacity. In the example illustrated by message CDF 410, β=5.

The message CDF shown in FIG. 4 is only an example of possible distributions, a message distribution for a particular environment can be estimated or curve-fit (e.g., based on message requests, etc.). For example, empirical data for message requests may be parameter-fit using log-linear, Pareto, or other statistical models to determine a message CDF for a particular environment.

In some examples, the VRDN may use message replication for the message redundancy coding scheme. For message replication in a VRDN having N storage nodes, message redundancy policy u maps each message index x to an integer between 0 and N. Assuming that the ways in which a given message x is stored on u(x) nodes are equally probable, and each node has a message retrieval reliability $M_{rr}$ expressed as the probability that a message stored at a given node can be successfully read out (e.g., including the possibility of drive failures and UREs, etc.), the probability that message x can be retrieved from storage is given by:

$$\phi_u(x) = \sum_{i=1}^{u(x)} \binom{u(x)}{i} M_{rr}^i (1 - M_{rr})^{u(x)-i} \quad (11)$$

The VRDN parameters (e.g., number of storage nodes N, types of storage nodes, total storage L, etc.) may be iteratively adapted until a desired information rate $R_2$ can be provided. For each iteration, the optimal message redundancy policy u(x) may be determined by solution of the optimization determined by expressions 7 and 8 as discussed above, with the message delivery reliability $\phi_u(x)$ given by expression 11.

While the techniques for selecting an optimal message redundancy policy u(x) may provide an optimized message availability from the VRDN 130-*a* $P_I$ message redundancy policy u(x) may alternatively be selected based on simplified or heuristic techniques. For example, the message redundancy policy u(x) may be determined by a normalized curve fit (e.g., linear, log-linear, polynomial, etc.) of the message PDF ρ(x). As another example, heuristic approaches for determining the message redundancy policy u(x) may include gradient ascent, monte carlo search, simulating annealing, and the like. Heuristic approaches may, for example, provide a quasi-optimal message redundancy policy u(x) with less computational complexity.

Figure 5:
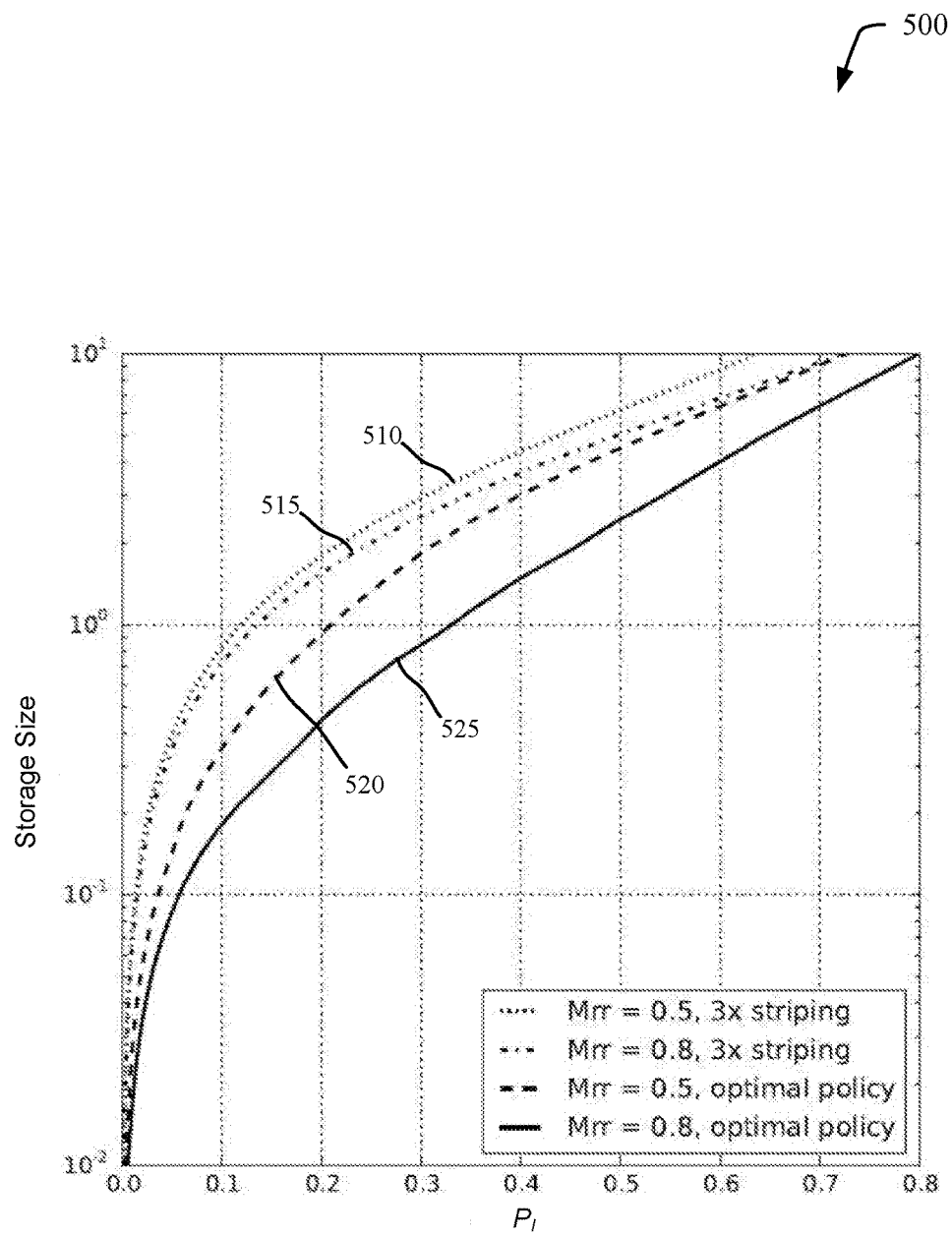
FIG. 5 shows a plot of example optimized storage policies compared to message striping for a variable redundancy delivery network in accordance with various aspects of the present disclosure.

FIG. 5 shows a plot 500 of example optimized storage policies compared to message striping for a variable redundancy delivery network in accordance with various aspects of the present disclosure. The curves in plot 500 are shown for a system using replication as the message coding scheme, N=5, and a heavy-tailed Pareto distribution CDF F(x) given in expression 10 having β=5, with storage sizes normalized such that F(1)=½. That is, storage of all messages in the range [0; 1] would account for half of the total messages expected over a given time period.

In plot 500, curve 510 shows the normalized storage size required to achieve a given $P_I$ using a uniform message redundancy policy of 3× striping (e.g., replication of messages across nodes) where $M_{rr}$=0.5. As shown by curve 520, a VRDN using a message redundancy policy u(x) optimized for the example message CDF F(x) and VRDN parameters can provide up to approximately a 2× increase in the achievable message availability $P_I$ at some storage sizes.

Curve 515 shows the normalized storage size required to achieve a given $P_I$ using a uniform message redundancy policy of 3× striping where $M_{rr}$=0.8. Curve 525 shows that a VRDN using a message redundancy policy u(x) optimized for the message CDF F(x) and VRDN parameters can provide greater than a 2× increase in the achievable message availability $P_I$ through a substantial portion of the range of storage sizes.

Figure 6:
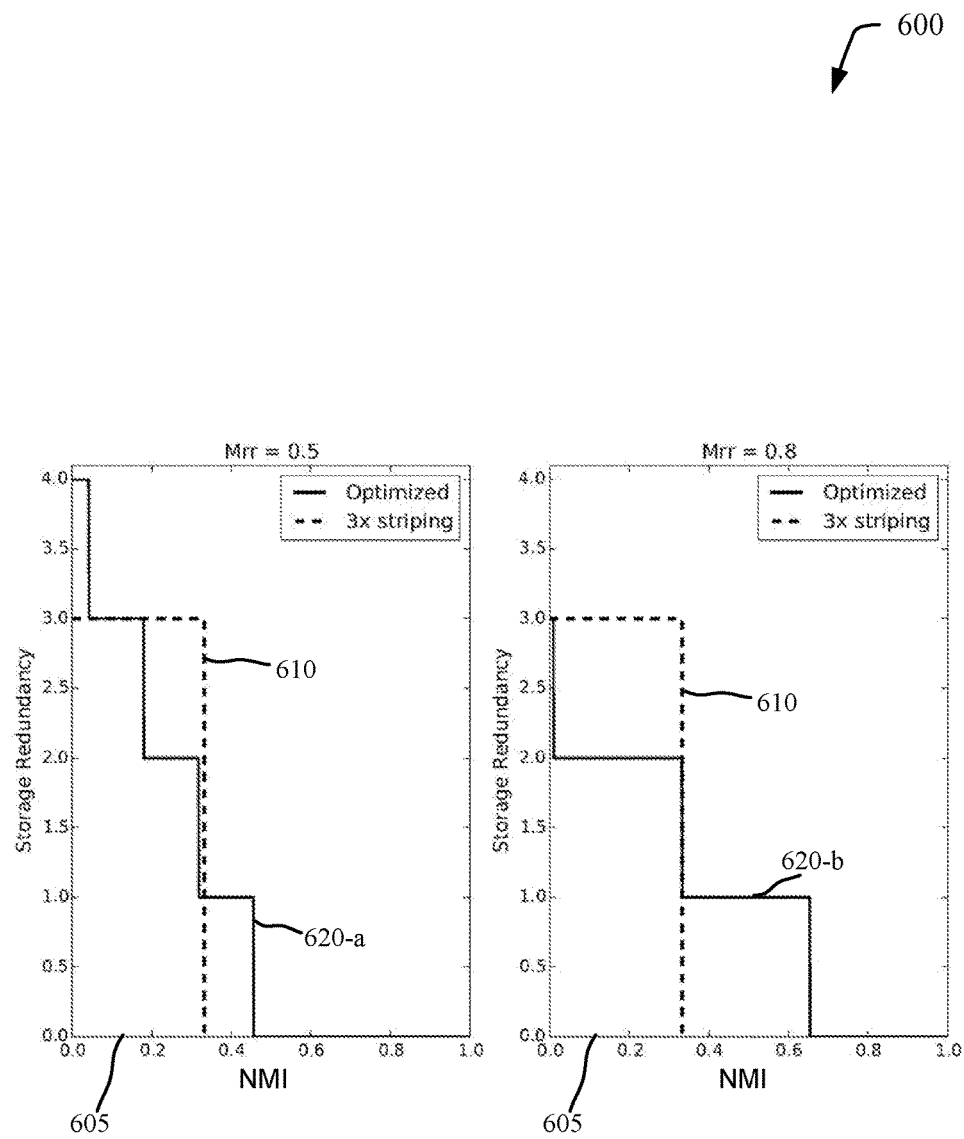
FIG. 6 shows plots of example variable redundancy storage policies for a variable redundancy delivery network in accordance with various aspects of the present disclosure.

FIG. 6 shows plots 600 of example variable message redundancy policies for a VRDN in accordance with various aspects of the present disclosure. Plots 600 show optimized message redundancy policies u(x) 620 used for calculating the message availability $P_I$ for storage size L=1 of plot 500. As with plot 500, the message axes 605 have been normalized for the heavy-tailed Pareto distribution CDF F(x) given in expression 10 having β=5 such that F(1)=½.

As shown by comparison to the 3× striping redundancy scheme 610, the optimized message redundancy policies u(x) 620 may increase redundancy for messages having a high probability of being requested (e.g., low message index) while decreasing redundancy for messages having a lower probability of being requested, and may have a higher proportion of total unique messages that are stored at least once.

The plots in FIGS. 5 and 6 are examples shown with simplified static system parameters such as N=5, and with changes in message redundancy for a given message having message index x being an integer of the message size (e.g., message replication). However, other system parameters and/or redundancy coding schemes may be used. For example, coding or parity schemes may be used to increase redundancy with any incremental redundancy step size, providing a higher level of granularity to the optimized message redundancy policy u(x). For other coding techniques or system designs, the message delivery reliability $\phi_u(x)$ and coding storage usage function g(n) may be derived such that the probability of message availability from the VRDN $P_I$ can be determined across the system variable state space according to the above techniques. For example, a system may include a combination of types of storage (e.g., HDD, SSD, etc.) and may use different coding schemes across different types of storage.

Optimization of probability of message availability from the VRDN 130-a $P_I$ according to the above techniques can be used to determine a total storage size L given a number of storage nodes N to provide a target information rate $R_2$. For example, for a system having N=5 and $M_{rr}$=0.8, if the target information rate $R_2$ is approximately 0.33 of $R_0$, a total storage size L=10° (based on the normalized message CDF) would be used. Typically, a system may have other constraints on system variables. For example, there may be a limit on the storage size T of each intermediate storage node. Constraints on various system variables may be defined, and techniques may be used to traverse the state space of the system design (e.g., gradient ascent, monte carlo search, simulating annealing, etc.) to design a system within overall system constraints (e.g., size, weight, cost, etc.).

Once a VRDN has been deployed, it may optimize information rate $R_2$ based on current system parameters (e.g., taking into account drive failure or sector failure, etc.) or changes in the message PDF ρ(x). For example, the VRDN 130 may monitor message requests and dynamically update the message PDF ρ(x) used for determining the message redundancy policy u(x).

Figure 7:
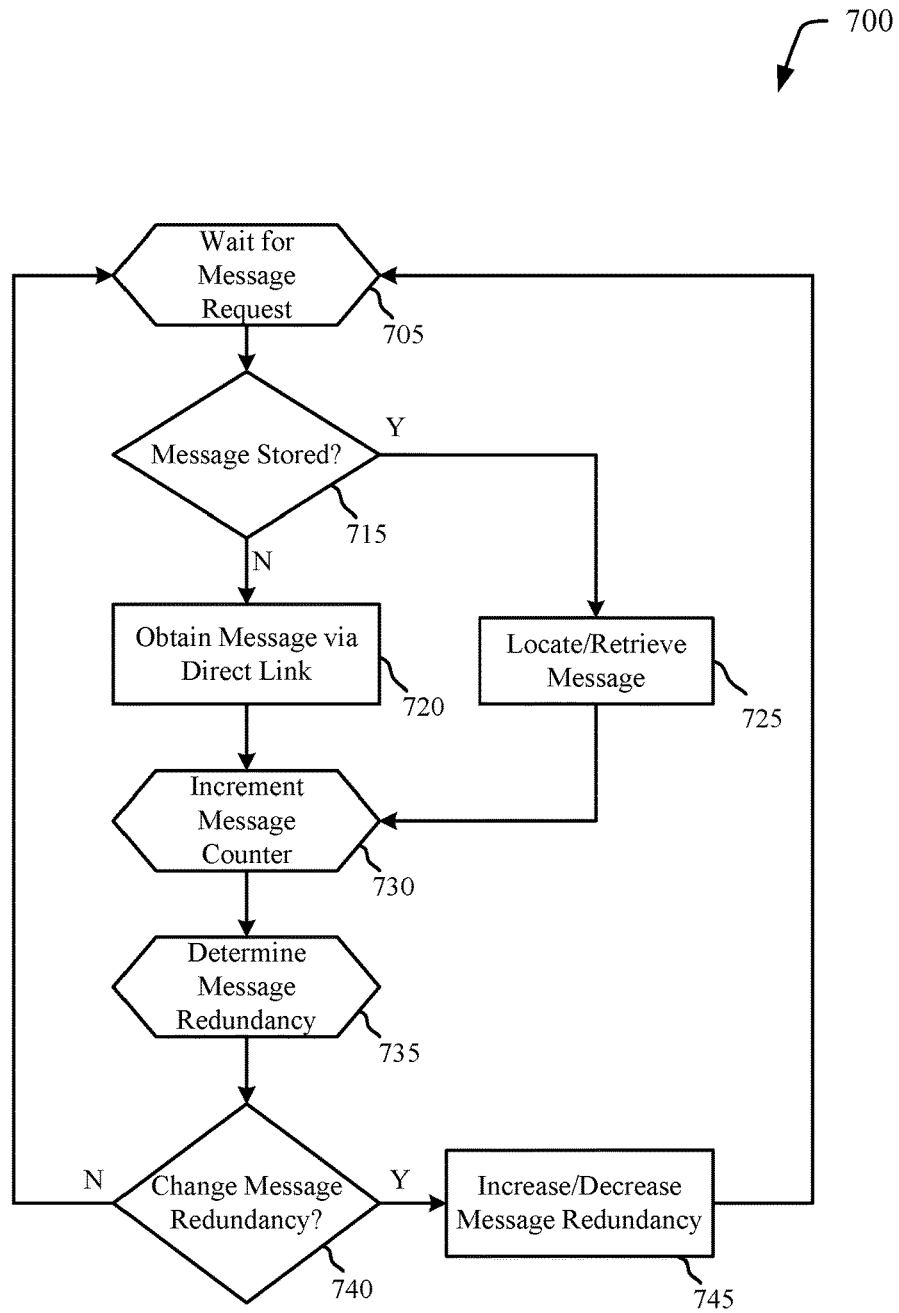
FIG. 7 shows a flow diagram of an example message flow for capacity enhancement of network access service in accordance with various aspects of the disclosure.

FIG. 7 shows a flow diagram 700 of an example message flow for capacity enhancement of network access service in accordance with various aspects of the disclosure. Flow diagram 700 may illustrate message management in a VRDN 130 of FIG. 1 or 3 for managing message storage and redundancy to provide capacity enhancement of a direct communications link based on a non-uniform probability distribution of requested messages. Flow diagram 700 may illustrate, for example, aspects of message flow 300 for providing capacity enhancement to a direct communications link 110.

Message flow 700 may begin at block 705, where message flow 700 may wait for message requests from a terminal node (e.g., communication devices 115 of FIG. 1). When a message request is received at block 705 for a message x, the message flow 700 may proceed to block 715 to determine if message x has already been stored in the VRDN 130 (e.g., with or without redundancy).

If, at block 715, it is determined that message x has not been stored, message flow 700 may proceed to block 720 where message x is retrieved via the direct communications link. If, at block 715, it is determined that message x has been stored, message flow 700 may proceed to block 725 where message x is retrieved from the VRDN 130. In some cases, the message has been stored with redundancy in the VRDN 130 and a first instance of the message (e.g., stored on a first intermediate storage node, etc.) is unavailable (e.g., because of drive failure or URE, etc.). A redundant copy or redundant data for the message may be retrieved from other intermediate storage node. At blocks 720 and 725, the message may be delivered to the terminal node (e.g., communication device 115 that requested the message).

At block 730, a message counter c(x) for the message may be incremented (or initialized if the message has not been previously requested) and the message flow 700 may proceed to block 735 where redundancy for the message is determined. In some examples, the message counters c(x) may be based on message requests over a time period (e.g., a month, a year, etc.). Thus, incrementing message counter c(x) at block 730 may include determining the message counter value c(x) based on the requests during the time period.

Redundancy for the message may be determined at block 735 based on a message redundancy policy u(x). For example, the message redundancy policy u(x) may define thresholds for various levels of redundancy and the message counter c(x) may be compared to the thresholds to determine the level of redundancy of the message.

Figure 8:
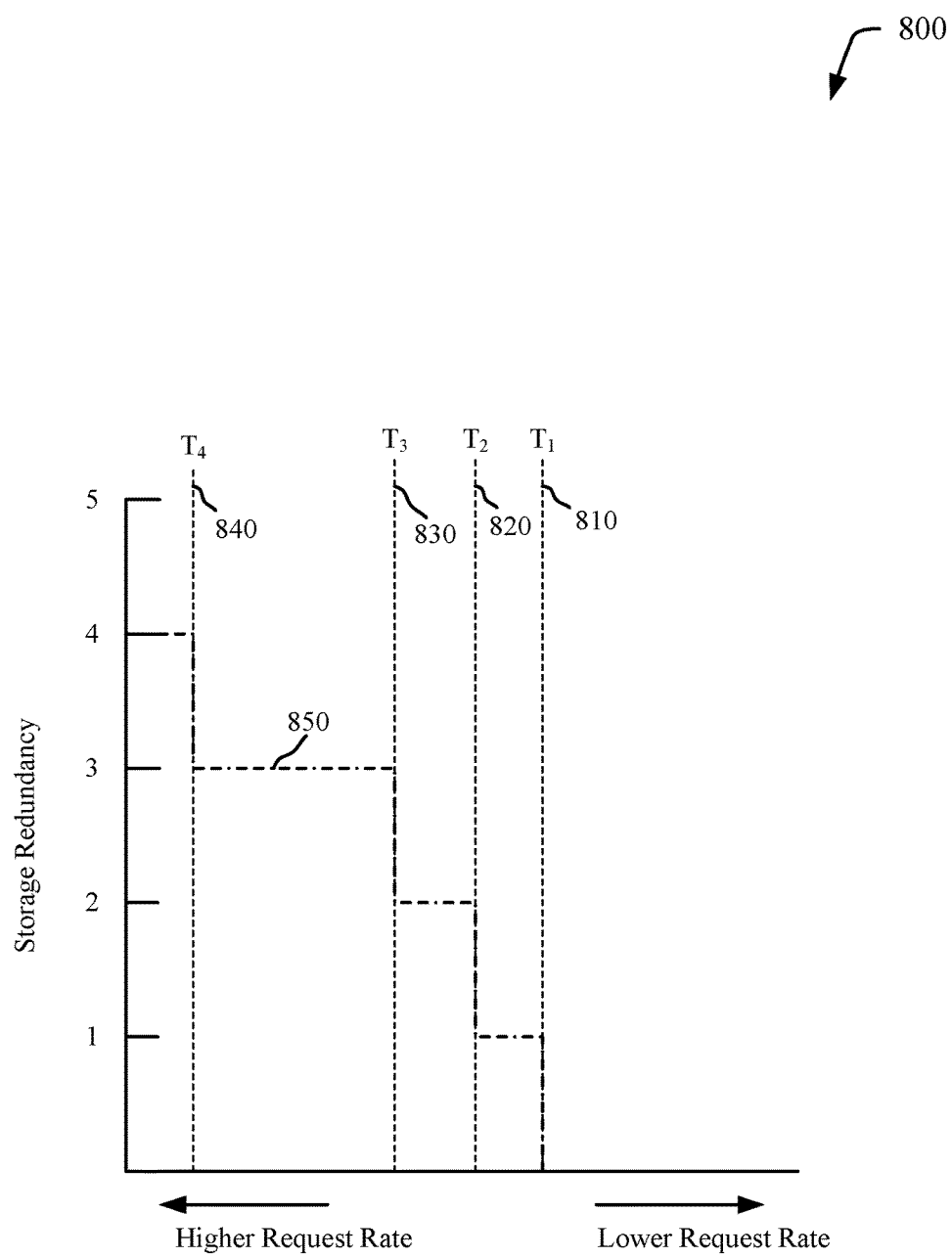
FIG. 8 shows a diagram of example storage redundancy thresholds for variable message redundancy in accordance with various aspects of the present disclosure.

FIG. 8 shows a diagram 800 of example storage redundancy thresholds for variable message redundancy in accordance with various aspects of the present disclosure. Diagram 800 may illustrate, for example, storage redundancy thresholds for a message redundancy policy 850 optimized based on a known or estimated message CDF according to the techniques described above.

In the illustrated example, thresholds $T_1$ 810, $T_2$ 820, $T_3$ 830, and $T_4$ 840 correspond to increases in message redundancy based on message request rate. Returning to FIG. 7, the message counter c(x) may be compared to thresholds $T_1$ 810, $T_2$ 820, $T_3$ 830, and $T_4$ 840 to determine the storage redundancy for message x. For example, the message may not be stored if the message counter c(x) is less than $T_1$ 810. As additional requests for the message are received, the message may be stored in a first location when the message counter c(x) is greater than $T_1$ 810 but less than $T_2$ 820, and may be stored in a second location when the message counter is greater than $T_2$ 820 but less than $T_3$ 830, and so on. The first location may be on a first intermediate storage node and the second location may be on a second intermediate storage node. In the example shown in diagram 800, the storage redundancy is shown in integer values (e.g., message replication). As described above, other coding techniques may be used to provide any level of granularity in message redundancy.

Additionally or alternatively, the message redundancy policy 850 may account for different reliability characteristics of different storage devices. For example, a message may be stored on a first intermediate storage node having a lower reliability characteristic (e.g., HDD, etc.) when the number of requests for the message is below a threshold and storing the message on a second intermediate storage node having a higher reliability characteristic (e.g., SSD, etc.) when the number of requests reaches the threshold. Storing the message on the second intermediate storage node may include erasing the message from the first intermediate storage node.

At block 740, the message flow 700 may determine if there is a change in message redundancy for the message. For example, incrementing of the message counter c(x) at block 730 may result in a change of storage redundancy for the message as determined by one or more thresholds for the message redundancy policy. Additionally or alternatively, the message redundancy policy may have been adapted (e.g., optimized for a change in system variables or message CDF, etc.), changing the redundancy for the message. If the message flow 700 determines at block 740 that the message redundancy has changed for the message, message flow 700 may increase or decrease the message redundancy as appropriate at block 745. If the message flow 700 determines that the message redundancy has not changed, then the message flow may return to block 705 to wait for additional message requests.

Although not shown in message flow 700, the message redundancy policy u(x) and/or message coding scheme for messages may be adapted periodically or upon occurrence of one or more events. For example, if a system variable changes (e.g., drive failure, etc.), the message redundancy policy u(x) may be optimized for the new system variables. Additionally or alternatively, the message counters c(x) may be periodically updated based on time period of the requests. For example, message counters c(x) may reflect message requests for a rolling time period (e.g., month, year, etc.) and may be periodically (e.g., hourly, daily, etc.) updated based on the number of requests in the rolling time period. Then, the CDF may be updated and the message redundancy policy u(x) adapted for the updated CDF. Message redundancy may be re-evaluated for all stored messages based on the new message redundancy policy u(x).

Figure 9:
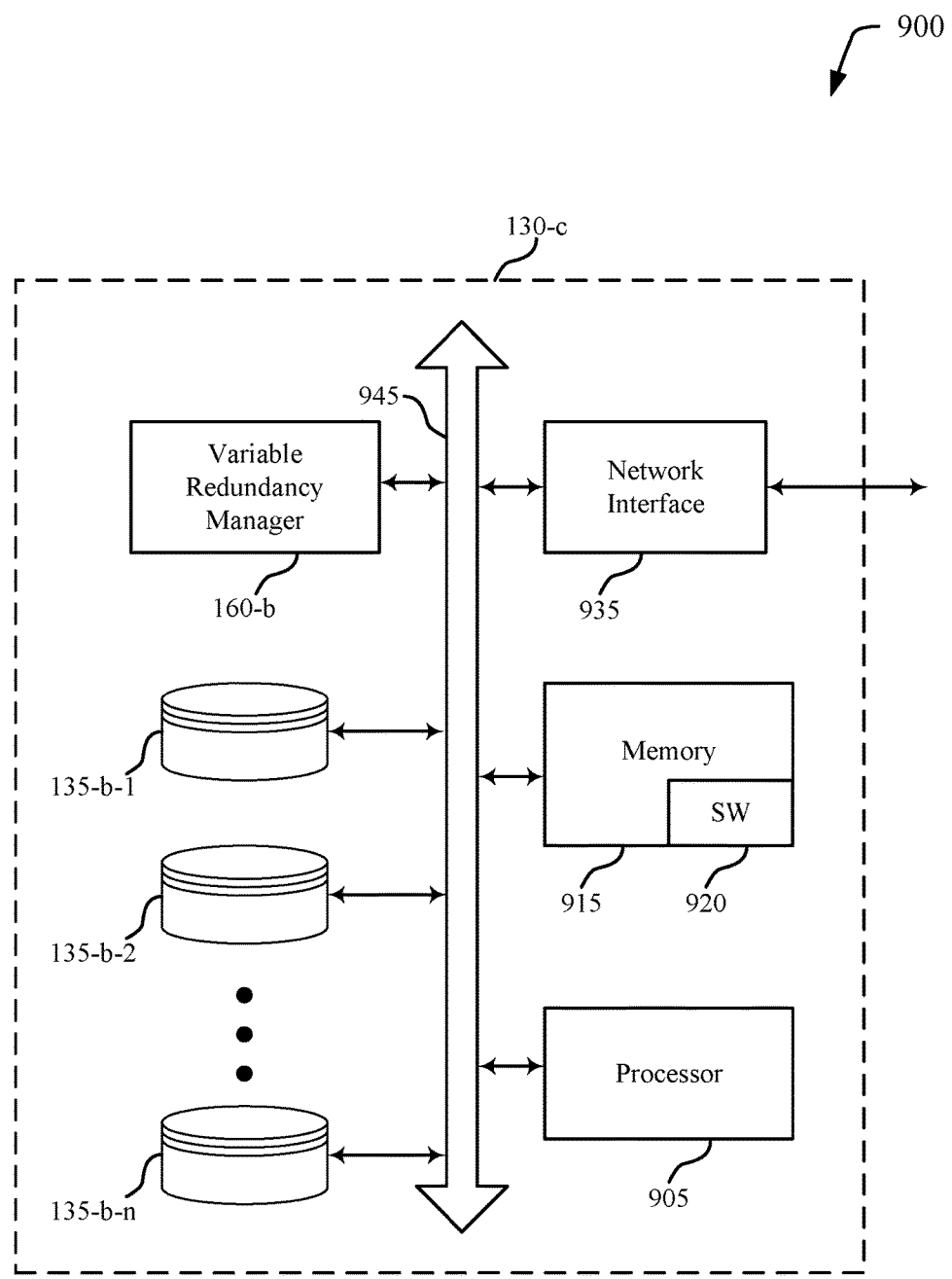
FIG. 9 shows a block diagram of a variable redundancy delivery network in accordance with various aspects of the present disclosure.

FIG. 9 shows a block diagram 900 of a variable redundancy delivery network 130-c in accordance with various aspects of the present disclosure. VRDN 130-c includes a network interface 935, variable redundancy manager 160-b, processor 905, memory 915 (including software (SW) 920, and ISNs 135-b-1, 135-b-2, . . . , 135-b-n, each of which may communicate, directly or indirectly, with one another (e.g., via buses 845).

The network interface 935 may communicate bi-directionally, with one or more networks or devices. For example, the VRDN 130-c may be connected with a network gateway device 150 via network interface 935. The network interface 935 may include, for example, one or more wired or wireless interfaces such as Ethernet, Wi-Fi, Fibre Channel, small computer system interface (SCSI), and the like, for communication with other devices (e.g., via a LAN or SAN).

The variable redundancy manager 160-b may illustrate, for example, aspects of variable redundancy manager 160-a as described above with reference to FIG. 1. The variable redundancy manager 160-b may control redundancy of messages on VRDN 130-c based on frequency of request of the messages and a non-uniform distribution of message requests. For example, variable redundancy manager 160-b may determine a message redundancy policy u(x) based on a CDF F(x) or PDF ρ(x) of messages and other system variables of the VRDN 130-c (e.g., number of ISNs 135-b, storage size T of the ISNs 135-b, total storage size L, estimated message retrieval reliability $M_{rr}$, etc.). The variable redundancy manager 160-b may receive message requests (e.g., via network interface 935) from a terminal node (e.g., one or more user devices 115, etc.), determine if requested messages are stored in one or more ISNs 135-b, and retrieve stored messages from the ISNs 135-b for delivery to the terminal node (e.g., via network interface 935).

The memory 915 may include random access memory (RAM) and read only memory (ROM). The memory 915 may store computer-readable, computer-executable software/firmware code 920 including instructions that, when executed, cause the processor 905 to perform various functions described herein (e.g., managing message redundancy, etc.). Additionally or alternatively, the software/firmware code 820 may not be directly executable by the processor 905 but cause the processor 905 (e.g., when compiled and executed) to perform the functions described herein. The processor 905 may include an intelligent hardware device, (e.g., a central processing unit (CPU), a microcontroller, an application specific integrated circuit (ASIC), etc.).

Figure 10:
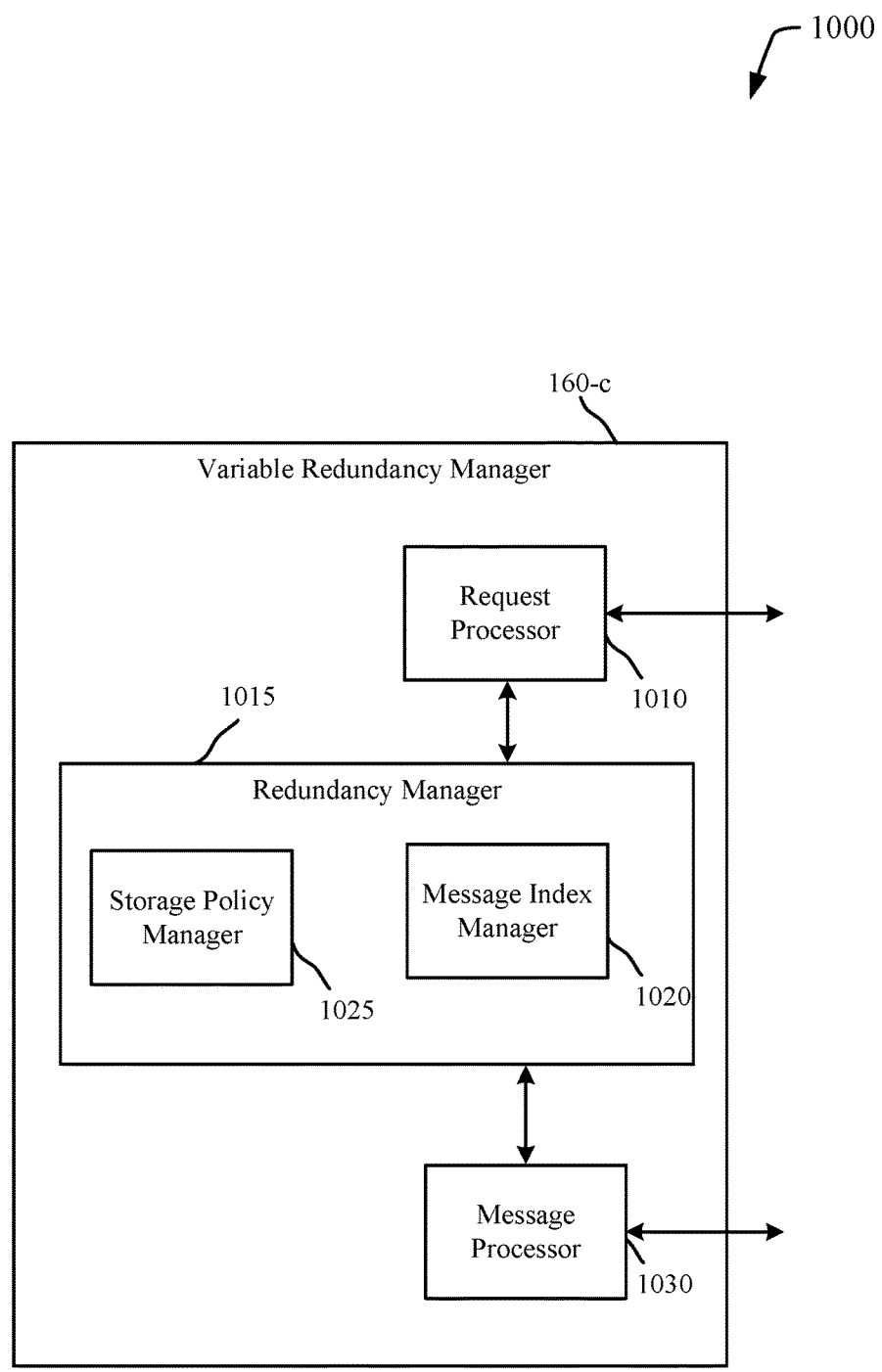
FIG. 10 shows a block diagram of a variable redundancy manager for capacity enhancement of a direct communications link in accordance with various aspects of the disclosure.

FIG. 10 shows a block diagram 1000 of a variable redundancy manager 160-c for capacity enhancement of a direct communications link in accordance with various aspects of the disclosure. The variable redundancy manager 160-c may illustrate, for example, aspects of a variable redundancy managers 160 as described above with reference to FIG. 1 or 9. The variable redundancy manager 160-c may include request processor 1010, redundancy manager 1015, and message processor 1030. Each of these components may be in communication with each other, directly or indirectly.

Request processor 1010 may control functions related to receiving and processing requests for messages. Request processor 1010 may maintain message counters for messages stored in the variable redundancy delivery network 130 and may, for example, determine the distribution (e.g., CDF, PDF, etc.) of message requests.

Redundancy manager 1015 may control message redundancy and message index tracking. Redundancy manager 1015 may include message index manager 1020 and storage policy manager 1025. Message index manager 1020 may receive the message counter for a requested message from request processor 1010 and compare the message counter to one or more thresholds $T_X$ for determining the message redundancy, as described above with reference to FIGS. 7 and 8.

Storage policy manager 1025 may determine a redundancy coding scheme and message redundancy policy u(x) for message redundancy based on the message CDF or PDF and the system parameters (e.g., number of storage nodes, total storage size, message retrieval reliability from individual nodes, etc.). In some examples, the type of message redundancy coding may vary as a function of message index or number of requests. For example, storage policy manager 1025 may use repetition codes, parity codes, Hamming codes, Reed-Solomon codes, turbo codes, LDPC codes, or other suitable forms of coding. Storage policy manager 1025 may determine the code rate for a given message based on the redundancy rate for the given message. For example, storage policy manager 1025 may determine a number of ISNs 135 in which to store a given message for a repetition coding scheme. Message index manager 1020 may maintain the storage indexes associated with each message for subsequent message retrieval from an available message location.

Message processor 1030 may perform functions related to storing and retrieving messages from the indexed locations determined by the message index manager 1020. For example, message processor 1030 may retrieve and deliver stored messages to a terminal node. Message processor 1030 may store a message in a first location (e.g., a first ISN indicated by message index manager 1020) based on a redundancy rate for the message determined by the redundancy manager 1015. The redundancy manager 1015 may increase the redundancy rate for the message based on the message being provided to the terminal node a number of times greater than a second threshold (e.g., upon additional requests for the message), and the message processor 1030 may store the message in a second location (e.g., a second intermediate storage node indicated by message index manager 1020).

Message processor 1030 may determine that the message is to be delivered to the terminal node (e.g., upon requests for the message from communication devices 115, etc.), and may retrieve the message from the first or second location and deliver the message to the terminal node. In some cases, message processor 1030 may determine that the first intermediate storage node is unavailable, and may retrieve the message from the second location (e.g., the second ISN) and deliver the message stored in the second location to the terminal node. The first ISN may be unavailable due to, for example, a drive failure or other URE.

The components and modules of variable redundancy manager 160-c of FIG. 10 may, individually or collectively, be implemented with circuitry (e.g., ASICs, etc.) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

Figure 11:
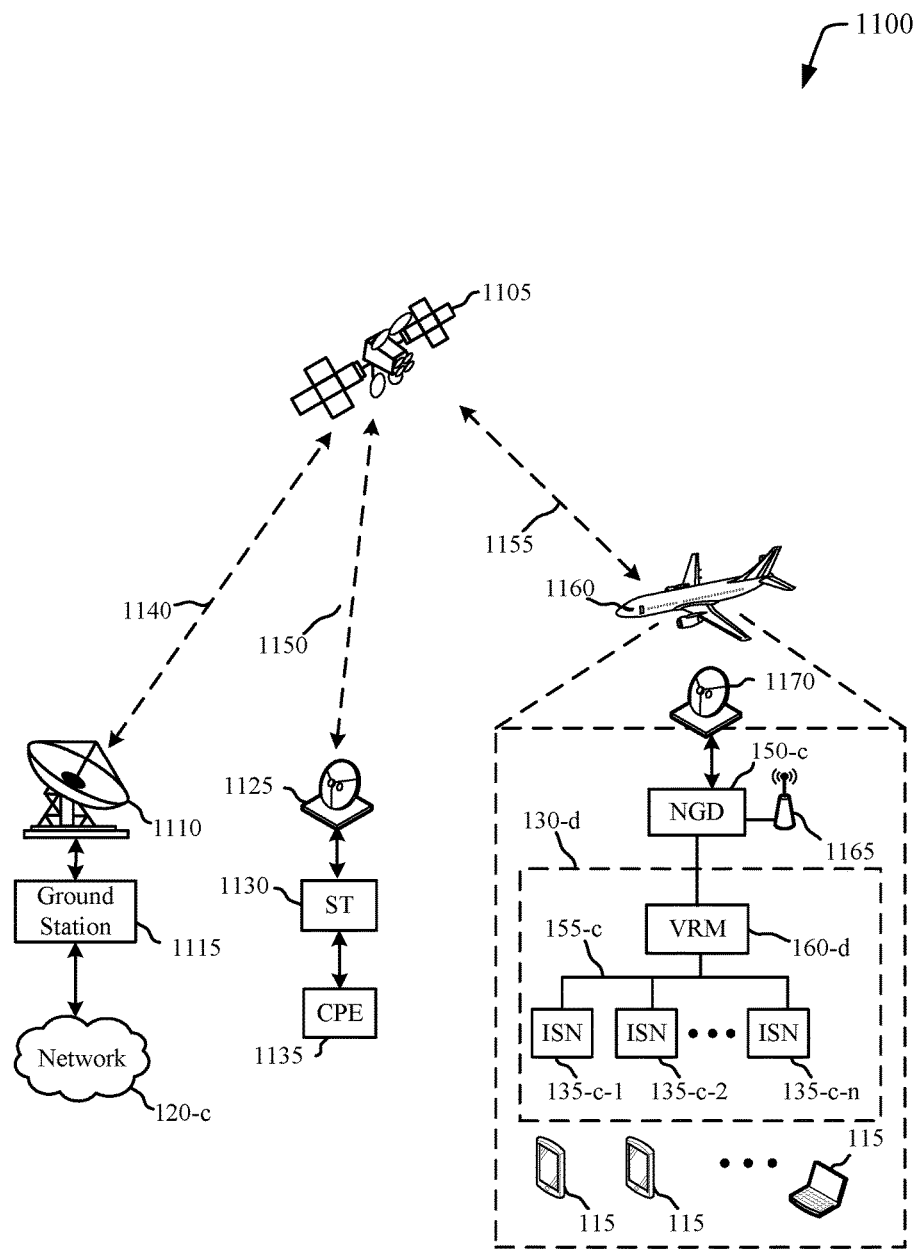
FIG. 11 shows a simplified diagram of an example satellite communications system 1100 which may implement capacity enhancement of a direct communication link in accordance with various aspects of the disclosure.

FIG. 11 shows a simplified diagram of an example satellite communications system 1100 which may implement capacity enhancement of a direct communication link in accordance with various aspects of the disclosure. The satellite communication system 1100 includes a satellite 1105 (or multiple satellites 1105), a ground station 1115, a ground station antenna system 1110, and a network gateway device 150-c.

In operation, the satellite communication system 1100 provides network access service via the network gateway device 150-c to multiple communication devices 115 on a mobile platform such as aircraft 1160. For example, the satellite communication system 1100 may provide for two-way communications between the network gateway device 150-c and a network 120-c via the satellite 1105 and the ground station 1115. The communication devices 115 may be connected to the network gateway device 150-c via one or more access points 1165 (e.g., WAPs, etc.).

The satellite or satellites 1105 may include any suitable type of communication satellite. In some examples, some or all of the satellites may be in geostationary orbits. In other examples, any appropriate orbit (e.g., medium earth orbit (MEO), low earth orbit (LEO), etc.) for satellite 1105 may be used. In one embodiment, the satellite 1105 operates in a multi-beam mode, transmitting a number (e.g., typically 20-150, etc.) of spot beams each directed at a different region of the earth. This can allow coverage of a relatively large geographical area and frequency re-use within the covered area. Spot beams for communication with subscribers may be called service beams while spot beams for communication with gateways such as ground station 1115 may be called feeder beams. In embodiments, the service beams are fixed location spot beams, meaning that the angular beam width and coverage area for each service beam does not intentionally vary with time.

The ground station 1115 sends and receives signals to and from the satellite 1105 via communication link 1140 using the ground station antenna system 1110. The ground station antenna system 1110 may be two-way capable and designed with adequate transmit power and receive sensitivity to communicate reliably with the satellite 1105. The ground station 1115 is connected to the one or more networks 120-c, which may be the networks 120 discussed with reference to FIG. 1 or 3.

The network gateway device 150-c may use an antenna 1170 to communicate signals with the satellite 1105 via the communication link 1155. The antenna 1170 may be mounted to an elevation and azimuth gimbal which points the antenna 1170 (e.g., actively tracking) at satellite 1105. The satellite communications system 1100 may operate in the International Telecommunications Union (ITU) Ku, K, or Ka-bands, for example from 17 to 31 Giga-Hertz (GHz). Alternatively, satellite communications system 1100 may operate in other frequency bands such as C-band, X-band, S-band, L-band, and the like. As illustrated in FIG. 11, network gateway device 150-c and antenna 1170 are mounted on an aircraft 1160. However, network gateway device 150-c and antenna 1170 may be used in other applications besides onboard the aircraft 1160, such as onboard boats, vehicles, or a stationary location where network access service is desired (e.g., a business, a school, etc.), in some cases.

The satellite communications system 1100 may also include one or more subscriber terminals 1130, which may also be provided network access service via satellite 1105 and ground station 1115. Each subscriber terminal 1130 is located within at least one service beam and is capable of two-way communication with the satellite 1105 via an antenna 1125. Each subscriber terminal 1130 may be connected with (e.g., may provide network access service for) one or more customer devices 1135 (e.g., desktop computers, laptops, set-top boxes, smartphones, tablets, Internet-enabled televisions, and the like). These customer devices 1135 may also be known as customer premises equipment (CPE).

Typically, satellite communications system 1100 may have a fixed capacity based on a system bandwidth and a number of spot beams for frequency re-use. While that capacity may be allocated to subscriber terminals 1130 and users associated with communication devices 115 in a variety of ways, it may not always be possible to provide a high data rate to all subscriber terminals 1130 and communication devices 115 at the same time via signals transmitted over the communication links 1150 and 1155, respectively.

In embodiments, the satellite system 1100 is configured to increase an effective information rate provided to communication devices 115 using a VRDN 130-c as described above. The VRDN 130-c may include multiple intermediate storage nodes 135 (e.g., intermediate storage nodes 135-c-1, 135-c-2, 135-c-n, etc.) and variable redundancy manager 160-d. Variable redundancy manager 160-d may control redundancy of messages on VRDN 130-d based on frequency of request of the messages and a non-uniform distribution of message requests. For example, variable redundancy manager 160-d may determine a message redundancy coding scheme and/or message redundancy policy $u(x)$ based on a message CDF $F(x)$ or message PDF $\rho(x)$ and other system variables of the VRDN 130-d (e.g., number of ISNs 135-c, storage size T of the ISNs 135-c, total storage size L, message retrieval reliability $M_{rr}$, etc.). The variable redundancy manager 160-c may receive message requests (e.g., via network interface network gateway device 150-c) from a terminal node (e.g., one or more user devices 115, etc.), determine if requested messages are stored in one or more ISNs 135-c, and retrieve stored messages from the ISNs 135-c for delivery to the terminal node (e.g., via network interface network gateway device 150-c). The VRDN 130-d may be connected to the network gateway device 150-c via a local network 155-c (e.g., LAN, SAN, etc.). In alternative embodiments, the variable redundancy manager 160-d may be a component of the network gateway device 150-c.

Thus, the effective communication rate to the communication devices 115 may be given as $R_0=R_1+R_2$, where $R_1$ is the information rate of a direct link (e.g., satellite communications link 1155) and $R_2$ is the information rate provided by the VRDN 130-d via indirect links (e.g., via network gateway device 150-c and/or AP 1165).

One or more parameters of the VRDN 130-d may be selected to provide the information rate $R_2$. The one or more parameters may include, for example, reliability characteristics of the one or more intermediate storage nodes 135-c, a storage size of the one or more intermediate storage nodes 135-c, a number of the one or more intermediate storage nodes 135-c, a message redundancy coding scheme, and a message redundancy policy u(x) (i.e., redundancy of storage of messages in the one or more intermediate storage nodes 135-c). The one or more parameters may be determined based on an estimated information rate $R_0$ from the network 120-c to the communication devices 115 serviced via the network gateway device 150-c, a non-uniform probability density of the messages (e.g., CDF F(x) and/or PDF ρ(x)), or a number of users accessing a communication service provided via the network gateway device 150-c.

Determining the reliability characteristics of the one or more intermediate storage nodes 135-c may include determining a type of storage (e.g., HDD, SSD, etc.) for each of the intermediate storage nodes 135-c. The storage types for different intermediate storage nodes 135-c may be different. For example, VRDN 130-d may include some high reliability storage intermediate storage nodes 135-c (e.g., SSD storage devices) and some lower reliability storage (e.g., HDD storage devices) intermediate storage nodes 135-c. In some examples, a message may be initially (e.g., upon a first request or a number of requests greater than a first threshold) stored in the lower reliability storage intermediate storage nodes 135-d. If the number of requests for the message increases (e.g., above a second threshold, etc.), the message may be stored in the a high reliability storage intermediate storage node 135-c. The instances of the message in the lower reliability storage intermediate storage nodes 135-c may be erased upon storing the message in the high reliability storage intermediate storage node 135-c.

Determining a storage size and/or number for each of the intermediate storage nodes 135-c may be based, for example, on the library size M, the non-uniform probability density of the messages, a number of users (e.g., communication devices 115) being provided a communication service via the network gateway device 150-c, and/or the information rate R'.

Determining the redundancy of storage may include calculating one or more redundancy thresholds $T_X$ for increasing redundancy based on the non-uniform probability density of the messages. For example, the redundancy thresholds $T_X$ may be determined to match the redundancy to the non-uniform probability density of the messages (e.g., based on optimization or heuristic techniques as discussed above, etc.).

Figure 12:
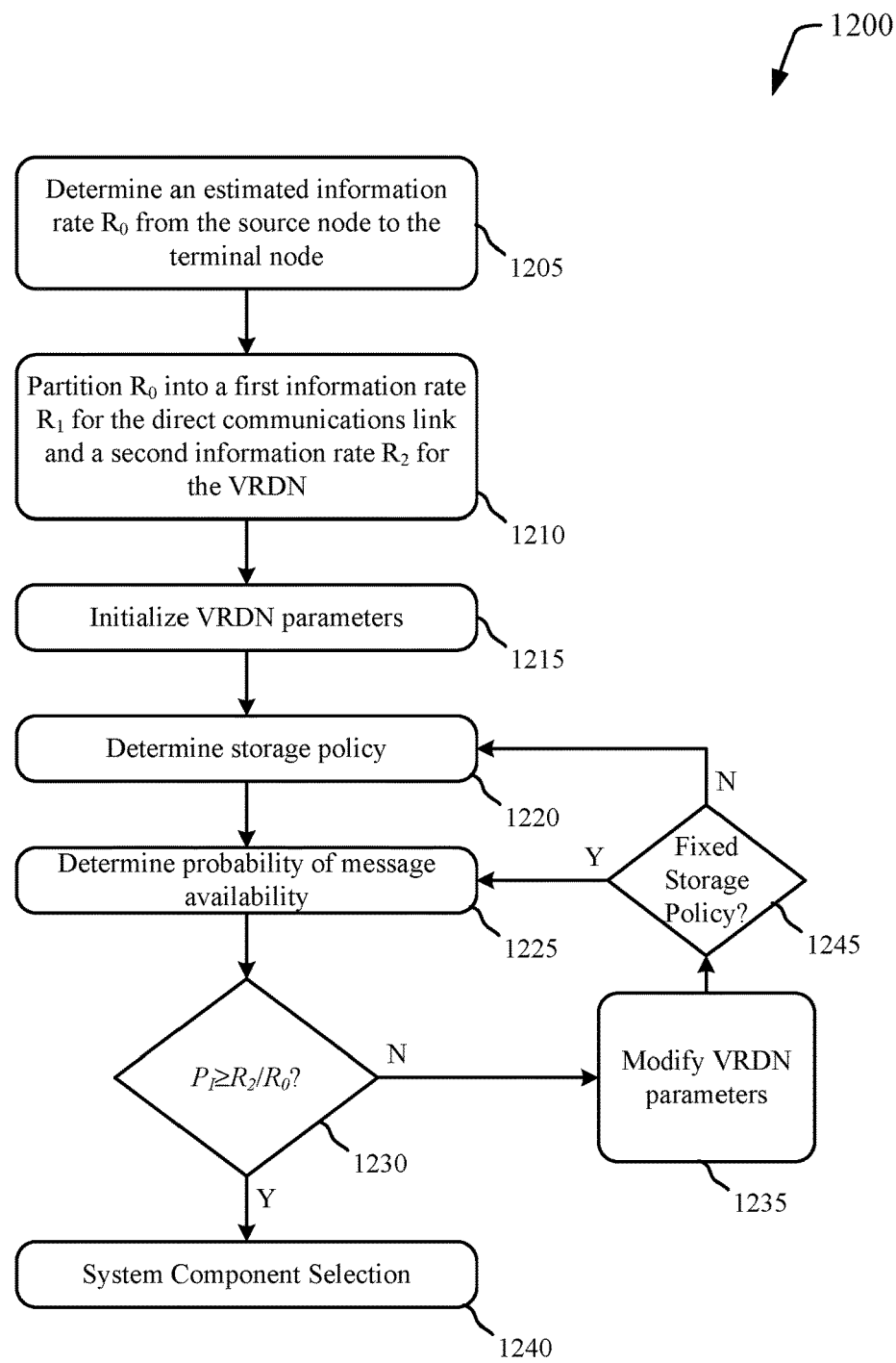
FIG. 12 shows a flowchart diagram of an example method for capacity enhancement of a communications system in accordance with various aspects of the disclosure.

FIG. 12 shows a flowchart diagram of an example method 1200 for capacity enhancement of a communications system in accordance with various aspects of the disclosure. The communications system may include a terminal node coupled to a source node via a direct communications link and via a variable redundancy delivery network comprising one or more intermediate storage nodes. The direct communications link may be, for example, a satellite communication link between the source node and the terminal node as illustrated in FIG. 11.

At block 1205 of method 1200, an estimated information rate $R_0$ from the source node to the terminal node may be determined. The estimated information rate $R_0$ may be determined, for example, based on a number of users accessing a communication service provided by the source node via the terminal node (e.g., number of seats on a plane, etc.) and statistical information relevant to user information rate (e.g., average data rate, peak data rate, etc.).

At block 1210, the estimated information rate $R_0$ may be partitioned into a first information rate $R_1$ for the direct communications link and a second information rate $R_2$ for the variable redundancy delivery network. The first information rate may be based on a channel capacity of the direct communications link.

At block 1215, one or more parameters of the variable redundancy delivery network may be initialized. The one or more parameters may include, for example, reliability characteristics of intermediate storage nodes of the variable redundancy delivery network, a storage size of the intermediate storage nodes, and a number of the intermediate storage nodes. In some examples, some of the parameters may be predetermined or empirically determined for a selected system architecture (e.g., reliability characteristics of the intermediate storage nodes, message library size, estimated number of users, etc.). Block 1215 may correspond to selecting an initial system model estimated to provide the second information rate $R_2$. In some examples, one or more of the parameters may be selected based on component availability (e.g., storage size of the intermediate storage nodes, etc.). In some examples, initialization of the one or more parameters may take the form of selecting multiple system models with different sets of parameters (e.g., a first system model using HDDs for the intermediate storage nodes, a second system model using SSDs, a third system model using a mix of HDDs and SSDs, etc.).

At block 1220, a storage policy may be determined for the system model. The storage policy may include a message redundancy coding scheme and a message redundancy policy u(x), and may be determined based on a non-uniform probability density of the messages (e.g., estimated message CDF F(x) and/or message PDF ρ(x)). In some examples, the message redundancy coding scheme and a message redundancy policy u(x) may be fixed (e.g., independent of the system parameters of the VRDN, etc.). In some examples, the message redundancy policy u(x) may be an optimal message redundancy policy determined according to the techniques described above. In other examples, the message redundancy policy u(x) may be a simplified or heuristically determined policy. For example, the message redundancy policy u(x) may be determined by a normalized curve fit (e.g., linear, log-linear, polynomial) of the message PDF ρ(x).

At block 1225, the probability of message availability $P_I$ may be determined for the system model(s). For example, the message delivery reliability $\phi_u(x)$ may be determined based on the message redundancy policy $u(x)$ and other system parameters (e.g., message redundancy coding scheme, number of storage nodes N, total storage L, message retrieval reliability $M_{rr}$ for individual storage nodes, etc.) and the probability of message availability $P_I$ may be determined for the message PDF $\rho(x)$, message delivery reliability $\phi_u(x)$, and coding scheme function $g(n)$ as described above.

At block 1230, it may be determined if the probability of message availability $P_I$ for one or more of the system model(s) satisfies the condition $P_I \geq R_2/R_0$ for given system target values for $R_2$ and $R_0$. If, at block 1230, the probability of message availability $P_I$ does not satisfy the condition, one or more parameters of the VRDN may be modified at block 1235. For example, more reliable storage devices (e.g., a different type or model of intermediate storage node) may be selected, a different number of intermediate storage nodes may be selected, a different storage size for the intermediate storage nodes may be selected, or a different message redundancy coding scheme may be selected at block 1235.

Where, at block 1245, the storage policy is selected as a fixed storage policy (e.g., independent of VRDN parameters, etc.), the probability of message availability $P_I$ may then be determined for the new system model at block 1225 and compared against the design condition at block 1230. Where it is determined that the storage policy is dependent on the VRDN parameters at block 1245 (e.g., optimized message redundancy policy, heuristically determined message redundancy policy, etc.), the message redundancy policy $u(x)$ may then be determined for the new system model at block 1220 prior to determination of the probability of message availability $P_I$ at block 1225. In some cases, multiple system models may be generated at block 1235 by modifying one or more parameters in different ways to compare system options. For example, system models having the same total storage size L but different numbers of intermediate storage nodes may be generated at block 1235 based on available component sizes (e.g., twenty 1 TB drives vs. ten 2 TB drives, etc.). Various techniques may be used to traverse the state space of the system design at block 1235 (e.g., gradient ascent, monte carlo, simulating annealing, etc.).

When one or more system models satisfy the condition $P_I \geq R_2/R_0$ for a given desired $R_2$ and estimated $R_0$ at block 1230, the system parameters may be determined and components selected for the VRDN at block 1240. In some cases, multiple system models may satisfy the condition at block 1230. In such a case, the system component selection for the VRDN at block 1240 may be based on an additional metric (e.g., selected to minimize a cost metric, selected based on system size or weight constraints, etc.).

Figure 13:
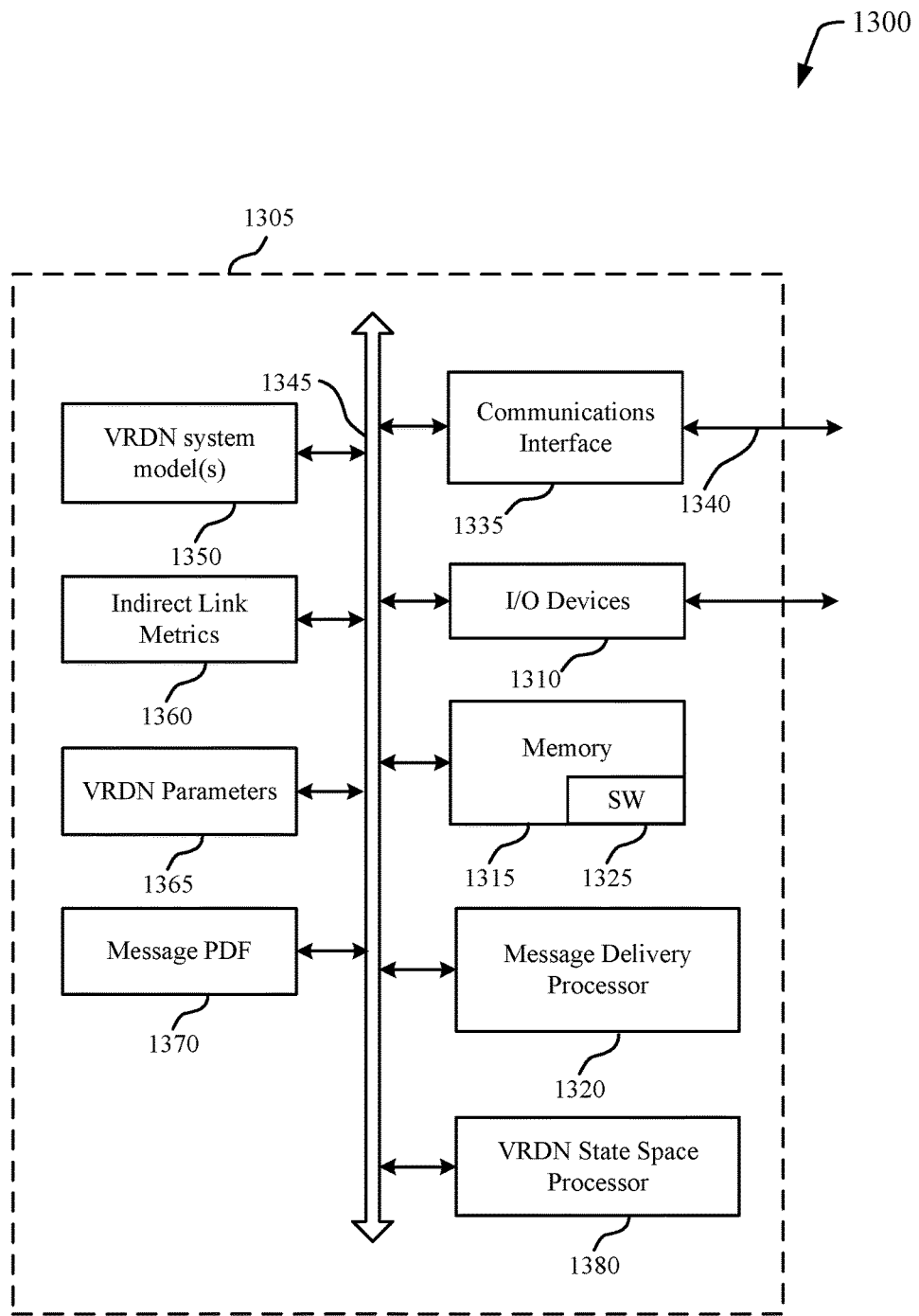
FIG. 13 shows a diagram of a design environment for designing a variable redundancy delivery network in accordance with various aspects of the present disclosure.

FIG. 13 shows a diagram 1300 of a design environment 1305 for designing a variable redundancy delivery network in accordance with various aspects of the present disclosure. The design environment 1305 includes VRDN state space processor 1380, message delivery processor 1320, memory 1315, I/O devices 1310, and communications module 1335, which each may be in communication, directly or indirectly, with each other, for example, via one or more buses 1345. The communications module 1335 may be configured to communicate bi-directionally via one or more wired or wireless links 1340.

The design environment 1305 includes VRDN system model(s) 1350, which may include functional characteristics of a VRDN designed according to VRDN parameters 1365. VRDN parameters 1365 may include a set of parameters for each VRDN system model 1350, which may include number of storage nodes N, type of storage node (which may be different for different storage nodes), message retrieval reliability $M_{rr}$ for each storage node, total storage L, message redundancy coding scheme, and/or message redundancy policy $u(x)$.

Message delivery processor 1320 may calculate indirect link metrics 1360 for one or more VRDN system model(s) 1350. For example, message delivery processor 1320 may determine the probability of message availability $P_I$ for one or more of the VRDN system model(s) 1350 based on VRDN parameters 1365 for the VRDN system model(s) 1350 and a message PDF 1370 as described above with reference to block 1225 of FIG. 12.

VRDN state space processor 1380 may determine if the probability of message availability $P_I$ for one or more of the VRDN system model(s) 1350 satisfies the condition $P_I \geq R_2/R_0$ for indirect link metrics 1360 (e.g., target values for $R_2$ and $R_0$). VRDN state space processor 1380 may use various techniques to modify the VRDN parameters 1365 for the VRDN system model(s) 1350 to traverse the state space of the system such as gradient ascent, monte carlo, simulating annealing, and the like. The VRDN state space processor 1380 may iteratively modify the VRDN parameters 1365 for the VRDN system model(s) 1350 and the message delivery processor 1320 may calculate indirect link metrics 1360 for the updated VRDN system model(s) 1350. The VRDN state space processor 1380 may determine that one or more sets of VRDN parameters 1365 satisfy the condition $P_I \geq R_2/R_0$ for indirect link metrics 1360, and may further select system components for a VRDN 130 by applying one or more additional metrics (e.g., a cost metric, a size metric, a weight metric, etc.).

The memory 1315 may include random access memory (RAM) and read only memory (ROM). The memory 1315 may store computer-readable, computer-executable software/firmware code 1325 including instructions that are configured to, when executed, cause the VRDN state space processor 1380 and message delivery processor 1320 to perform various functions described herein (e.g., traverse the state space of the system, calculate indirect link metrics 1360 for the VRDN system model(s) 1350, etc.). Alternatively, the software/firmware code 1325 may not be directly executable by the performance metrics calculation processor 1320 but be configured to cause a computer (e.g., when compiled and executed) to perform functions described herein. The performance metrics calculation processor 1320 may include an intelligent hardware device, e.g., a central processing unit (CPU), a microcontroller, an ASIC, etc. may include RAM and ROM.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Processors may perform the necessary tasks. Features implementing functions may also be physically located at various positions, including being distributed such that portions of functions are implemented at different physical locations.

Furthermore, embodiments may be implemented by hardware, software, firmware, middleware, microcode, hardware description languages, or combinations thereof. When implemented in software, firmware, middleware or microcode, the program code or code segments to perform the necessary tasks may be stored in a computer-readable medium such as a storage medium. A computer-readable medium may include, for example, RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A communication system comprising:
    a network gateway device on a mobile platform coupled with a plurality of user communication devices on the mobile platform via respective local communication links;
    a ground station coupled with a network, the network comprising at least one source node for a message library;
    a direct communication link coupling the ground station to the network gateway device, the direct communication link to deliver messages of the message library to the network gateway device from the ground station in response to requests by the plurality of user communication devices; and
    a variable redundancy delivery network on the mobile platform and coupled with the network gateway device, the variable redundancy delivery network comprising one or more intermediate storage nodes storing the messages with variable redundancy for delivery to the plurality of user communication devices in response to subsequent ones of the requests for the messages based on a non-uniform probability density of the requests for the messages, wherein at least one parameter of the variable redundancy delivery network is selected based at least in part on a desired information rate to be provided by the variable redundancy delivery network, and wherein the non-uniform probability density of the messages is determined based on a number of the requests for the messages in a rolling time period.

2. The communication system of claim 1, wherein the variable redundancy for the storing of the messages comprises a storage policy for increasing redundancy based on a number of times the messages have been delivered to the plurality of user communication devices.

3. The communication system of claim 2, wherein the storage policy is determined based at least in part on a storage size of the one or more intermediate storage nodes or a number of the one or more intermediate storage nodes.

4. The communication system of claim 2, wherein the storage policy is determined based at least in part on a message retrieval reliability associated with the stored messages.

5. The communication system of claim 2, wherein the storage policy is determined based on an optimization process applied to a function of a probability of message availability.

6. The communication system of claim 2, wherein the storage policy is adapted based at least in part on an identified failure of a storage node of the variable redundancy delivery network.

7. The communication system of claim 2, wherein the storage policy is adapted based at least in part on an identified change of the non-uniform probability density of the messages.

8. The communication system of claim 2, wherein the storage policy comprises message replication, parity coding, Reed-Solomon coding, or a combination thereof.

9. The communication system of claim 1, wherein the one or more intermediate storage nodes of the variable redundancy delivery network are configured in a non-redundant disk array configuration.

10. The communication system of claim 1, wherein the direct communication link comprises a satellite communication link between the ground station and the network gateway device.

11. A method for capacity enhancement of a communications system, the method comprising:
    coupling a network gateway device on a mobile platform with a plurality of user communication devices on the mobile platform via respective local communication links;
    coupling the network gateway device with a ground station via a direct communication link, the ground station coupled with a network, the network comprising at least one source node for a message library;
    coupling the network gateway device with a variable redundancy delivery network on the mobile platform, the variable redundancy delivery network comprising one or more intermediate storage nodes, wherein at least one parameter of the variable redundancy delivery network is selected based at least in part on a desired information rate to be provided by the variable redundancy delivery network;

delivering messages of the message library to the network gateway device from the ground station in response to requests by the plurality of user communication devices;

determining a non-uniform probability density of the messages based on a number of the requests for the messages in a rolling time period;

storing the messages for delivery from the variable redundancy delivery network to the plurality of user communication devices with variable redundancy based on the non-uniform probability density of the requests for the messages; and delivering the messages to the plurality of user communication devices from the variable redundancy delivery network in response to subsequent ones of the requests for the messages.

12. The method of claim 11, wherein the variable redundancy for the storing of the messages comprises a storage policy for increasing redundancy based on a number of times the messages have been delivered to the plurality of user communication devices.

13. The method of claim 12, wherein the storage policy is determined based at least in part on a storage size of the one or more intermediate storage nodes or a number of the one or more intermediate storage nodes.

14. The method of claim 12, wherein the storage policy is determined based at least in part on a message retrieval reliability associated with the stored messages.

15. The method of claim 12, wherein the storage policy is determined based on an optimization process applied to a function of a probability of message availability.

16. The method of claim 12, further comprising:
identifying a failure of a storage node of the variable redundancy delivery network; and adapting the storage policy based at least in part on the identified failure of the storage node.

17. The method of claim 12, further comprising:
identifying a change in the non-uniform probability density of the messages; and
adapting the storage policy based at least in part on the identified change in the non-uniform probability density of the messages.

18. The method of claim 12, wherein the storage policy comprises message replication, parity coding, Reed-Solomon coding, or a combination thereof.

19. The method of claim 11, wherein the one or more intermediate storage nodes of the variable redundancy delivery network are configured in a non-redundant disk array configuration.

20. The method of claim 11, wherein the direct communication link comprises a satellite communication link between the ground station and the network gateway device.

21. A non-transitory computer readable medium storing code for capacity enhancement of a communications system comprising a network gateway device on a mobile platform coupled with a ground station via a direct communication link and a variable redundancy delivery network on the mobile platform, the variable redundancy delivery network comprising one or more intermediate storage nodes, wherein at least one parameter of the variable redundancy delivery network is selected based at least in part on a desired information rate to be provided by the variable redundancy delivery network, the ground station coupled with a network that comprises at least one source node for a message library, the code comprising instructions executable by a processor for:

coupling the network gateway device with a plurality of user communication devices on the mobile platform via respective local communication links;

delivering messages of the message library to the network gateway device from the ground station in response to requests by the plurality of user communication devices;

determining a non-uniform probability density of the messages based on a number of the requests for the messages in a rolling time period;

storing the messages for delivery from the variable redundancy delivery network to the plurality of user communication devices with variable redundancy based on the non-uniform probability density of the requests for the messages; and delivering the messages to the plurality of user communication devices from the variable redundancy delivery network in response to subsequent ones of the requests for the messages.

* * * * *